United States Patent
McGee

(10) Patent No.: US 9,284,471 B2
(45) Date of Patent: Mar. 15, 2016

(54) FILM COATINGS BASED ON POLYALKYLIMINE CONDENSATION POLYMERS

(71) Applicant: Jindal Films Americas LLC, Macedon, NY (US)

(72) Inventor: Dennis E. McGee, Penfield, NY (US)

(*) Notice: Subject to any disclaimer, the term of this patent is extended or adjusted under 35 U.S.C. 154(b) by 0 days.

(21) Appl. No.: 14/348,823

(22) PCT Filed: Jan. 18, 2013

(86) PCT No.: PCT/US2013/022074
§ 371 (c)(1),
(2) Date: Mar. 31, 2014

(87) PCT Pub. No.: WO2013/165486
PCT Pub. Date: Nov. 7, 2013

(65) Prior Publication Data
US 2014/0234591 A1    Aug. 21, 2014

(30) Foreign Application Priority Data
May 1, 2012  (WO) ................ PCT/US2012/035977

(51) Int. Cl.
*C09D 179/02* (2006.01)
*C08G 73/02* (2006.01)

(52) U.S. Cl.
CPC .......... *C09D 179/02* (2013.01); *C08G 73/0266* (2013.01); *Y10T 428/24802* (2015.01); *Y10T 428/273* (2015.01); *Y10T 428/31511* (2015.04)

(58) Field of Classification Search
CPC .............. C09D 179/02; Y10T 428/273; Y10T 428/24802; Y10T 428/31511
See application file for complete search history.

(56) References Cited

U.S. PATENT DOCUMENTS 3,963,806 A * 6/1976 Dornte ......................... 528/361
2003/0207121 A1  11/2003 McGee

FOREIGN PATENT DOCUMENTS

JP    04-018426 A  *  1/1992 .................. C08J 5/18

OTHER PUBLICATIONS

EPOMIN (Polyethyleneimine)—Apr. 2005.*

* cited by examiner

*Primary Examiner* — Betelhem Shewareged

(57) ABSTRACT

A coated thermoplastic film and a method of making the coated film, wherein at least one side of the film is coated with a coating composition, the coating composition comprising the reaction product of a polyalkyleneimine having at least primary nitrogens, and an epoxide compound having at least one epoxide moiety and a weight average molecular weight ($M_w$) of at least 200 g/mole. The weight of the dried coating compound on each side of the film is within the range from 0.005 g/m² to 0.100 g/m², and is especially useful in coating films to allow for printability when the film surface will be exposed to high levels of silicon that might come from, for example, release paper/films.

26 Claims, 7 Drawing Sheets

FILM COATINGS BASED ON POLYALKYLIMINE CONDENSATION POLYMERS

CROSS-REFERENCE TO RELATED APPLICATION

The present application claims priority to PCT/US2012/035977 filed on May 1, 2012, the contents of which are incorporated by reference.

FIELD OF THE INVENTION

The present invention(s) relate to film coatings to improve printability, and more particularly to epoxide or glycidyl-modified polyalkyleneimines and its use as a coating on at least one side of a polyolefin film.

BACKGROUND

Commercially available clear pressure sensitive label (PSL) films work very well for printing applications, but some currently used coatings for such films contains VOCs that constrain the allowed coating weights in certain countries. An example of a clear film used in PSL is Label-Lyte™ 50 LL539. Cost pressures have driven some roll-stock laminators that use pre-siliconized liners to use low-cost liners that have high levels of free silicone. When laminated to these liners with relatively high levels of free silicone, certain films do not perform well. Therefore, what is needed is a film coating that is essentially VOC-free that can also tolerate lamination to liners having higher levels of free silicone.

There have been progressive changes and improvements in printable film coatings. U.S. Pat. No. 6,893,722 discloses the use of an amine functional styrenated polyacrylate-based coatings with unsaturation to enhance cross-linking that demonstrates improved printability on polypropylene films. WO 2012-134695 describes film coatings that retain some essential elements of U.S. Pat. No. 6,893,722 that yield excellent UV printability and print durability (isopropyl alcohol resistance, pasteurization resistance, etc.) but without VOCs and without the need of a complex polymerization process (and the associated equipment constraints). However, further tests of coatings described in WO 2012-134695 showed significantly worse print performance in instances in which the printable coating was exposed to a silicone release liner, and the performance was worse than films made for such printing, especially if the printer used on-press corona treatment to cross-link the excess silicone coming from the low-cost liners. A key element taught in WO 2012-134695 is modification of a polyalkyleneimine (PAI) backbone in such a way to yield a dry coating that contained moieties of ethenic unsaturation from the group consisting of acrylic, methacrylic, and enamine. The present disclosure is to a different kind of modification of PAI polymers by reacting glycidyl ethers of ethoxylated long-chain alcohols and other such modifiers with primary and secondary amines in the PAI backbone.

Other related publications include U.S. Pat. No. 7,086,732; U.S. Pat. No. 6,866,383; U.S. Pat. No. 6,503,989; U.S. Pat. No. 6,428,878; U.S. Pat. No. 6,297,328; U.S. Pat. No. 5,296,530; U.S. Pat. No. 5,525,662; U.S. Pat. No. 5,498,659; U.S. Pat. No. 5,811,121; U.S. Pat. No. 5,380,587; U.S. Pat. No. 5,382,473; U.S. Pat. No. 5,419,960; U.S. Pat. No. 5,789,123; U.S. Pat. No. 5,827,627; US 2011/0254909; and US 2007/0248810; EP 1,502,759; EP 1,148,104; and the data sheet for Epomin™ polyethyleneimine from Nippon Shokubai, 2011.

SUMMARY

Described herein are coated thermoplastic films, wherein at least one side of the film is coated with a coating composition, the coating composition comprising the reaction product of a PAI having at least primary amine, and an epoxide compound having at least one epoxide moiety, preferably one epoxide moiety, and a weight average molecular weight (Mw) of at least 200 or 300 or 400 or 500 or 800 or 1000 g/mole; or within a range of from 200 or 300 g/mole to 600 or 800 or 1000 g/mole.

Also described are coated thermoplastic films having a coating composition on at least one side of the film, the coating composition comprising a substituted PAI having at least primary amines:

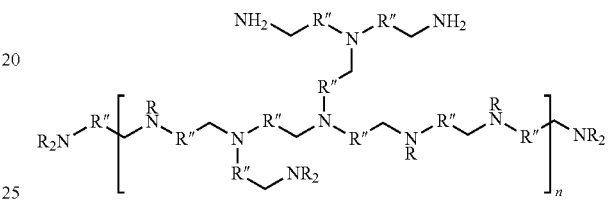

wherein each R is independently a hydrogen or an epoxide-derived group having at least one epoxide moiety and a weight average molecular weight ($M_w$) of at least 500 or 800 or 1000 g/mole; each R" is selected from divalent $C_1$ to $C_4$ or $C_6$ or $C_{10}$ alkylene groups; and wherein n is a value within the range of from 50 to 100 or 400 or 600 or 800 or 1000 or 2000 or 3000 or 4000, wherein the degree and type of branching along the polymer backbone is variable, this formula represents only one of several types of branching that can occur.

Also described is a method for making a coated film comprising: combining in water a PAI having at least primary amines, and an epoxide compound having at least one epoxide moiety and a weight average molecular weight ($M_w$) of at least 200 or 300 or 400 or 500 or 800 or 1000 g/mole, forming a reaction product; diluting the aqueous reaction product to a solids level within the range of from 0.1 or 0.25 or 0.5 or 1 or 2 or 4% to 5 or 10 or 15 or 20%; applying the diluted reaction product evenly to at least one surface of a thermoplastic film; drying the reaction product on the at least one film surface to form a dried coating composition at a temperature within the range of from 70 or 80° C. to 120 or 130 or 140° C.; wherein the weight of the dried coating compound on each side of the film is within the range from 0.005 or 0.010 or 0.015 g/m² to 0.035 or 0.040 or 0.050 or 0.075 or 0.100 g/m².

The various descriptive elements and numerical ranges disclosed herein for the coating compositions and the coated films or method of making the coated films can be combined with other descriptive elements and numerical ranges to describe the invention(s); further, for a given element, any upper numerical limit can be combined with any lower numerical limit described herein.

DETAILED DESCRIPTION

Figure 1:
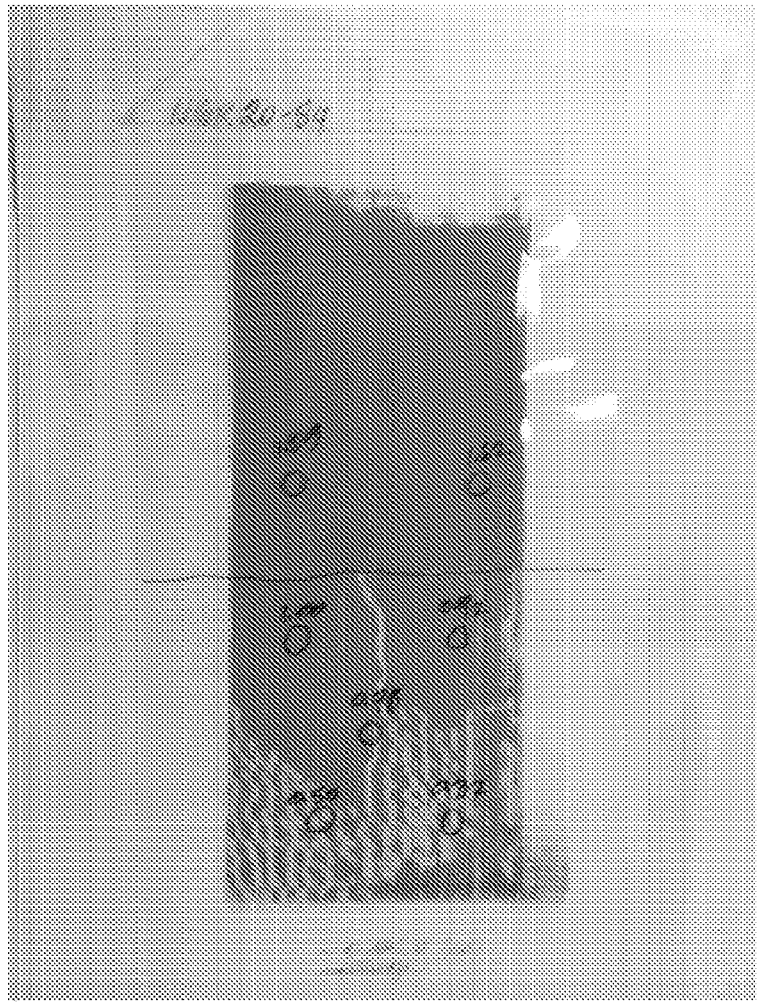
FIG. 1 is a photograph of an acrylate-polyethyleneimine coated film that has been exposed to silicon from a liner, then having been corona treated below the line drawn half-way down the length of the film, followed by treatment with printing ink (blue)

The invention(s) disclosed herein include a novel film coating comprising the reaction product of a PAI and an epoxide or glycidyl-type compound, preferably a higher molecular weight glycidyl ether. Such modification of the PAI backbone improves print performance after the print surface has been in contact with silicone-based release liners. Moreover, the inventor has found that ethenic unsaturation, as taught in U.S. Pat. No. 6,893,722 and WO 2012-134695, is actually detrimental to print performance of the coating when the print surface has been contaminated with silicone. Another surprising result is that all ethenic unsaturation and enamines can be removed from the substituted PAI without compromising ink adhesion, while ink laydown becomes more robust (with or without exposure to silicone and with or without corona treatment). Results for coatings prepared in this disclosure are comparable to those obtained with a commercial film Label-Lyte™ 50 LL534II (ExxonMobil Chemical Co.), which outperforms 50 LL539 in instances where liners having high levels of free silicone are used.

The "coating composition" described herein comprises (or consists essentially of, or consists of) at least the substituted PAI, but may also include some unreacted species (PAI and/or epoxide) and may include processing additives as described further herein. Once the coating composition is "dried" in that the solvent, mostly or all water, is removed, it is a dry coating or simply "coating". The reaction product between the PAI and epoxide compound described herein is not necessarily purified in that any unreacted species is separated from the substituted PAI, but such purification may be carried out.

The "polyalkyleneimine" (PAI) as used herein is a polymeric amine (or, as used herein "imine") having multiple amine groups. Useful PAIS can be represented by the formula: (R—NH)x, where (R—NH) is a polymeric or monomeric unit where R contains from 1 to 20 carbon atoms, preferably from 1 to 10 carbon atoms, more preferably from 1 to 6 carbon atoms, and most preferably from 1 to 4 carbon atoms; x is an integer from 1 to 500,000. More particularly, the PAI may be represented by the following general formula: (—NHCH$_2$CH$_2$—)$_m$[—N(CH$_2$CH$_2$NH$_2$)CH$_2$CH$_2$—]$_n$, wherein m is from 10 to 20,000, and n is from 20 to 2,000, preferably from 50 to 2000. Useful PAIS may also comprise secondary amines, and may also comprise tertiary amines, thus, most desirably, useful PAIS have a combination of primary, secondary and tertiary amines. The PAIS preferably have a level of secondary amines within the range of from 20 or 30 or 40% to 60 or 70 or 80% relative to all the nitrogens on the PAI. Also, the PAIS preferably have, independently, a level of primary and tertiary amines within the range of from 5 or 10 or 15% to 30 or 35 or 40 or 50% relative to all the nitrogens on the PAI. Preferably, the PAIS that are useful herein have a weight average molecular weight (M$_w$) of from 10,000 or 20,000 g/mole to 80,000 or 100,000 or 200,000 or 500,000 or 800,000 or 1,000,000 g/mole. Examples of desirable commercial PAIS include Lupasol™ FG, G20, G35, G100, HF, and P from BASF, and Epomin™ SP012, SP018, SP200, and P1050 from Nippon Shokubai.

The "epoxide compounds" described herein are compounds that have at least one epoxide moiety, preferably only one epoxide moiety, and possesses a weight average molecular weight (Mw) of at least 200 or 300 or 400 or 500 or 800 or 1000 g/mole; or within a range of from 200 or 300 g/mole to 600 or 800 or 1000 g/mole. An "epoxide-derived group" is simply an epoxide compound that has reacted via an epoxide carbon, either the alpha or beta, to form a substitution compound with an amine of the PAI.

Preferable epoxide compounds are selected from (II) and/or (III):

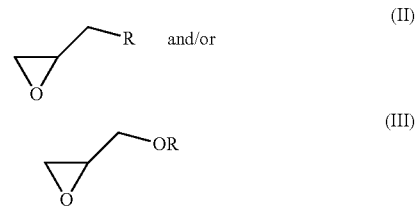

wherein R is hydrogen or another epoxide compound (the same or different), a fatty acid, a $C_{10}$ to $C_{50}$ alkyl; a $C_6$ or $C_8$ to $C_{22}$ or $C_{50}$ alkoxy, alcohol or ethoxylated alcohols; $C_6$ to $C_{40}$ phenyls or aryls and alkyl-substituted versions thereof, and combinations of any two or more of these groups.

Highly desirable epoxide compounds are glycidyl compounds selected from mono-functional glycidyl ethers of ethoxylated primary, secondary, and tertiary alcohols having a weight average molecular weight (M$_w$) of at least 200 or 300 or 400 or 500 or 600 g/mole, or within a range of from 200 or 300 g/mole to 500 or 800 or 1000 g/mole. Preferably, the epoxide compound is a mono-functional such as described in (II) or (III), water-soluble glycidyl ether having greater than or equal to 12 or 14 or 16 or 18 or 20 moles of ethoxylation; or within a range from 10 or 12 or 14 moles to 18 or 20 or 24 moles of ethoxylation.

Examples of potentially suitable epoxide compounds are mono-functional glycidyl ethers such as Denacol™ EX192, EX171 (based on primary long-chain alcohols, Denacol EX191 is the glycidyl ether of a primary alcohol containing a mixture of $C_{12}$ and $C_{13}$ carbon chains and no ethoxylation; Denacol EX171 is the glycidyl ether of an ethoxylated (15 moles) primary $C_{12}$ alcohol) and Denacol FCA-364-9, FCA-364-12, FCA-364-15, and FCA-364-20 (based on secondary long-chain alcohols having a mixture of $C_{11}$ to $C_{15}$ carbon chains and 9, 12, 15, or 20 moles of ethoxylation, respectively). Mono-functional, water-soluble glycidyl ethers having greater than or equal to 10 or 12 or 14 moles of ethoxylation are most preferable, or within a range of from 8 or 10 moles to 14 or 16 or 18 or 20 moles. Other water-soluble mono-functional glycidyl ethers like ethylene oxide, (R)-(+)-Glycidol, (S)-(−)-Glycidol, or racemic glycidol could be used alone or in conjunction with the ethoxylated, long-chain glycidyl ethers already described. If desired, especially in instances in which low-molecular weight PAIS are used, poly-functional glycidyl ethers like Denacol EX811, Denacol EX821, Denacol EX-314, or Denacol EX622 could be used alone or in conjunction with the ethoxylated, long-chain glycidyl ethers to boost molecular weight, although excessive cross-linking may create issues with viscosity and printability. Preferably, the epoxide compound is chosen so that there is little or no cross-linking of the coating on the surface of the film.

The present invention is directed in part to a coating composition comprising an epoxide-substituted PAI (or "substituted PAI"), that is the reaction product of a PAI having at least primary amine, and an epoxide compound having at least one epoxide moiety and a weight average molecular weight (Mw) of at least 100 or 150 or 200 or 250 g/mole. Described another way, the coating composition comprises (or consists essentially of, or consists of) a substituted PAI that may be represented by the formula (I):

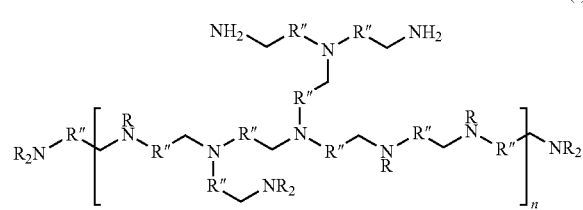

wherein each R is independently a hydrogen or an epoxide-derived group having at least one epoxide moiety and a weight average molecular weight ($M_w$) of at least 500 or 800 or 1000 g/mole; each R" is selected from divalent $C_1$ to $C_4$ or $C_6$ or $C_{10}$ alkylene groups; and wherein n is a value within the range of from 50 to 100 or 400 or 600 or 800 or 1000 or 2000 or 3000 or 4000, or 5,000 or 10,000 or 15,000 or 20,000 wherein the degree and type of branching along the polymer backbone is variable, this formula representative of only several types of branching that can occur. Preferably, ethenic unsaturation is substantially absent from the coating composition, meaning that no measurable amount of unsaturation is present.

In any case, the invention is also directed in part to a coated thermoplastic film, wherein at least one side of the film is coated with a coating composition, the coating composition comprising the reaction product of the PAI having at least primary amine, and the epoxide compound having at least one epoxide moiety, preferably one epoxide moiety, and a weight average molecular weight ($M_w$) of at least 200 g/mole. Alternately, if an epoxide compound having multiple epoxide moieties is used, prior to using the reaction product as a coating the excess epoxide moieties may be further reacted with another agent to prevent cross-linking via those groups.

In addition to reacting the PAI with an epoxide compound, other potential reactants may also be optionally present. In one case, the coating composition is the reaction product with the additional component of an acetoacetoxy compound. In the case where an acetoacetoxy compound is additionally used, the dry coating weight of the coating on the film may be within the range from 0.05 or 0.10 or 0.15 g/m² to 0.35 or 0.40 or 0.50 or 0.75 or 1.00 g/m²; otherwise, the weight of the dried coating compound on one or each side of the film is preferably within the range from 0.005 or 0.010 or 0.015 g/m² to 0.035 or 0.040 or 0.050 or 0.075 or 0.100 g/m². Hereinafter, all coating weights throughout this specification refer to dry weight. Additionally, or in lieu of the additional acetoacetoxy, the coating composition may be the reaction product with the additional component of ethylene oxide, propylene oxide, butylene oxide, or mixtures thereof; preferably ethylene oxide. The "reactions" that are referred to or implied all take place in aqueous medium, or media that is at least 60 or 70 or 80 or 90 wt % (or vole %) water.

When an acetoacetoxy compound is desired to react with the PAI amines, the acetoacetoxy compound is preferably selected from:

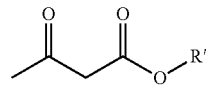

wherein R' is an acrylate or methacrylate moiety, a $C_1$ to $C_{20}$ alkyl or alkylene, a $C_1$ to $C_{20}$ alkoxy or hydroxide or alkyl-substituted versions thereof.

The invention(s) also include a method for making the coated film comprising combining in aqueous medium of at least 60 wt % (vole %) water, preferably consisting of water, a PAI as described above and an epoxide compound as described, forming a reaction product; diluting the aqueous reaction product to a solids level within the range of from 0.1 or 0.25 or 0.5 or 1 or 2 or 4% to 5 or 10 or 15 or 20%. The diluted reaction product is applied evenly to at least one surface of a thermoplastic film. The reaction product is dried on at least one film surface to form a dried coating composition at a temperature within the range of from 70 or 80° C. to 120 or 130 or 140° C. Preferably, the weight of the dried coating compound on one or each side of the film is within the range from 0.005 or 0.010 or 0.015 g/m² to 0.035 or 0.040 or 0.050 or 0.075 or 0.100 g/m². Any desirable method can be used to apply the suspension of reaction product (substituted PAI), such as a gravure roll, spray, etc., as is known in the art. Preferably, the composition of the aqueous coatings are such that the viscosity (25° C.) is less than 1000 or 800 or 500 or 400 cP, or within a range of from 10 or 20 or 50 cP to 500 or 800 or 1000 cP. The presence of some acetoacetoxy moieties can be used to adjust the viscosity, and/or dilution of the reaction product with water or an alcohol (esp. methanol, ethanol or isopropanol).

The PAI reaction product, or coating composition, may include other processing additives known in the art to facilitate processing or adjust the viscosity of the composition such as anti-foaming agents, including insoluble oils, dimethyl polysiloxanes and other silicones, certain alcohols, stearates and glycols such as ethylene glycol monohexyl ether (commercially available as Hexyl Cellosolve™ from Dow Chemicals) or Dowanol™ PM (also from Dow Chemical); wetting agents such as ionic and non-ionic surfactants; and particulates such as particles of alumina, silica, calcium carbonate, titanium dioxide, clays, magnesium silicate, aluminum silicate, calcium phosphate, PMMA, and other particulates, preferably having an average diameter of from 1 to 50 or 100 microns. Typically the aqueous coating formulation can comprise from 0.2 wt % up to 5 or 8 or 10 wt % by weight of the coating composition (including solvent) of processing additives.

In any case, the epoxide compound is preferably reacted with the PAI in an amount to bind to between 10 or 20 or 30 or 40 or 50% to 60 or 70 or 80 or 90 or 95 or 100% of the primary amines of the polymer. In a specific example, from 500 or 600 phr to 900 or 1000 phr of a mono-functional glycidyl ether is reacted with 100 phr of a PAI having a weight average molecular weight of from 50,000 to 90,000 g/mol; even more specifically, the epoxy equivalent weight (EEW) for the mono-functional glycidyl ether in this example is preferably within a range from 800 or 850 to 1000 or 1100 EEW and the PAI having an amine value within the range from 12 or 14 to 20 or 22 or 24 mmol/g solid and from 40 to 60% secondary amine content relative to all amines in the polymer.

The thermoplastic film, which is preferably flexible in that it can conform to round or otherwise irregularly-shaped objects, comprises at least one layer of a polymer selected from the group consisting of polypropylenes, polyethylenes, polyesters, nylons, and mixtures thereof. Most preferably, the thermoplastic film comprises polypropylene as the primary component, even if it is not the only component, as the film may comprise any number of layers commonly known in the art, with polypropylene at the core. Most preferably the thermoplastic film is an oriented polypropylene film.

The flexible thermoplastic films that are useful for the inventive coated films can be of most any structure but preferably have at least a SCS structure, where "C" is the core polypropylene layer, and "S" is a sealable or otherwise coatable skin layer. The "C" and "S" layers are most preferably co-extruded polymeric materials, the core layer having a thickness within the range of from 10 or 15 µm to 25 or 30 or 40 or 60 µm; the overall film preferably has a thickness within the range of from 20 or 30 µm to 40 or 50 or 60 or 80 or 100 µm. A flexible film may have any number of other tie-layers "T" and skin layers "S", each of which may be the same composition or different, as is known in the art, and thus may have an overall structure such as STCTS, STCS, SCTS, STCTSS, STCTS, SCTSS, etc. Once the printable coating is applied, the structure is one of P$^c$CS, P$^c$SCTS, P$^c$STCTS, etc., where "P$^c$" the printable coating which may include at least one primer layer against the film side as is known in the art.

The coated film may or may not be "energy treated" as by using heat, corona, plasma, e-beam, or other ionizing radiation imparted to at least part of the film surface, such treatment also including oxygen and/or mixed with inert gases such as nitrogen or argon. Preferably, the coated side of the film is not energy-treated (heat, corona, plasma, e-beam) prior to rolling and storage. The inventive films are useful for labels and thus may comprise printing upon the coated side of the film. The films may have incidental silicone (Si) on the coated surface as the result of being in contact with adjacent film layers in a roll or through other incidental contact or removable layer (e.g., such layers comprising release agents such as, or including, silicone), and thus the coated side of the film may have within the range from 2 or 3 or 5 mol % to 10 or 15 mol % silicon on its surface, based on the relative elemental abundance of all silicon-containing species detected by ESCA. Advantageously, even in the presence of such silicon on the coated side of the film, printing can be achieved on the coated side that is durable and esthetically pleasing.

Described here are non-limiting examples demonstrating the usefulness and advantages of the inventions described herein.

EXAMPLES

Comparative Example 1

This first comparative example is a description of a lab-scale method to quantify the problem being solved and an Example demonstrating the problem. This includes a description of the Relative Ink Density (RID) test method (using Little Joe™) for assessing the effects of corona treatment on printability after exposure of the print surface to silicone and reference to photographs of coated film samples in FIGS. 1-3:

Step 1: Preparation of Silicone Solution. Chloroform was used to create a 0.2% (2000 ppm) solution of Xiameter™ PMX-200 Silicone Fluid 60,000 cS. Once the silicone fluid had completely dissolved, nine parts of anhydrous isopropyl alcohol were added to the solution for every part of chloroform solution. The result was a clear solution containing 200 ppm silicone fluid that was roughly 90% IPA and 10% chloroform. This is used to coat a test film to mimic the effects of exposure to a liner containing silicon.

The preferred level of silicone was determined by trial and error using 50 LL534 II (ExxonMobil Chemical Co.) as a commercial benchmark (pass control with good tolerance to silicone contamination), 50 LL539 as another commercial benchmark (acceptable in most cases, but weaker in instances of abnormally high silicone contamination) and a prior art coated film prepared with a print surface made according to WO 2012-134695, which printed poorly under conditions in which 50 LL539 printed well. The level of silicone selected for the test details described below distinguished in the correct order among the two commercial benchmarks and the coated film according to WO 2012-134695.

Step 2: Apply Silicone to Test Sample. The sample that was to be printed with the print surface facing up was placed on a K Control Coater and clipped into place. Two pieces of unwrinkled brown paper with a total thickness of about 150 microns were placed under the test sample. The #2 red-handled Meier rod was locked into place. Care was taken that the weights were free to apply pressure to both ends of the Meier rod. Enough of the silicone solution was applied in front of the rod to ensure that the entire surface of the test sample was covered when the K Control Coater moved the bar across the sample: a wet spot on the paper at the edges and end of the sample was a good indicator of adequate coverage.

The drawdown speed setting was at '10' (maximum). When the drawdown was complete, the excess silicone solution was wiped off of the Meier rod and then the rod was cleaned with ethyl acetate. Typically, the silicone solution has completely evaporated off of the test sample by the time that the operator has cleaned the rod, but care was taken that the silicone solution was completely evaporated before performing the next step. The sample was air dried and not heated. Measurements made by ESCA showed that the Si level on a sample prepared in this way was about 2 mol % (mole percent), or between 2 and 15 mol % if coarser rods or more concentrated silicone solutions were used. The ESCA measurements were made on a PHI 5600 ESCA system, following the procedure for using that instrument.

Step 3: Corona Treat the Silicone-Treated Sample before Printing. Once dry, the silicone-treated sample was corona treated prior to printing in order to reproduce typical procedures followed in commercial film printing processes. However, part of the sample was left untreated, as explained below. Since the de-wetting phenomenon usually only occurs after corona treatment, only part of the sample film was protected from exposure to the corona so that there was a basis for comparing the ink density in the treated portion to ink density in the untreated portion. This was accomplished by covering the top half of the sample with a piece of uncoated 2-mil base OPP film like 196 MC550. Tape was used to affix the protective cover to the test sample. Care was taken to allow for sufficient separation in the untreated area from the spot where the bead of silicone solution was put down to make the drawdown, because this area can often have low ink density even if it was protected from the corona. Once the cover was put down, the place where the cover stops was marked. For poorly performing coated samples it was usually obvious, but the difference was harder to discern with better samples.

If the sample was to be treated on the Lab Coater (Talboy's Engineering), the power setting reading was set between 43 and 48% power when the treater was on. This was a normal fluctuation range. If sporadic readings are seen below 40% or above 50%, then the treater power was adjusted accordingly until stable. The test was developed with OPPaLyte™ 350 TW film as the carrier web, but almost any carrier web with a thickness of 25-50 microns is suitable.

Once the covered sample had passed through the treater, the web was stopped before the printable surface contacted any other rolls. When the web was stopped, the sample was removed from the carrier web, and the treatment cover (which can be used again) was removed from the sample.

Comparative tests show that the treater on a Mark Andy press (Pillar Model # UNW 1×1 10" TW equipped with a Model P6015 power supply having a maximum output of 1.5 kW) should be set at 0.35 kW power output (at about 100 fpm) for this test. After corona treatment, by whatever means, the treated sample was now ready to be printed.

Step 4: Print Samples on the Little Joe Proofing Press. Several unsuccessful attempts were made to devise a scheme that would work with an IGT Printability Tester F1 made by IGT Testing Systems (The Netherlands). However, reproducible responses were obtained using a Little Joe proofing press. The ink-transfer mechanism is different for these two pieces of equipment. The IGT Tester transfers ink from an anilox roll to a supported piece of film attached to a roller; the Little Joe transfers ink from a blanket to a flat piece of film held in place on a flat surface. Absolute ink densities are more variable off of the Little Joe unless all parts are cleaned after every drawdown. By determining relative ink densities (RID) between corona-treated and untreated areas of a sample, a significant amount of the repetitive cleaning can be eliminated. Typically, three samples can be tested from a single application of the ink to the platen. Care was taken to have relatively uniform ink laydown on the platen on the Little Joe.

Samples were printed on the Little Joe proofing press. The sample was taped to a single sheet of white copy paper and then mounted in the clips in the center of the Little Joe on the sample stage. No other paper or spacers were on the sample stage.

Prior to applying the ink to the sample, the blanket was rapidly worked over the platen seven times with the seventh pass continuing directly over the sample. The blanket was lifted on the return stroke so that the blanket only contacts the print surface one time. The rate of ink de-wetting can differ from sample to sample, so it is preferred to wait for 10 seconds or until all visual movement of the ink has stopped before passing the printed sample through the Fusion UV unit to cure the ink. Two passes were used to cure the ink when printed on the Little Joe.

Step 5: Measuring Ink Density. An XiRite™ 500 Series Spectrodensitometer was used for measuring ink density. Samples were tested over a stack of at least 50 sheets of white paper to ensure that the countertop color did not affect the reading. Two measurements were made in the untreated area, which was fairly uniform. If the ink laydown appeared poor in both treated and untreated zones, the sample was unsuitable for printing and the RID not measured or recorded. Two measurement locations were selected that appeared to be representative of the entire untreated zone (away from the contact location of the silicone bead, plus possible defects due to backside treatment and any obvious anomalies related to the drawdown). The location of the measurement was marked after making the measurement for future reference.

Figure 2:
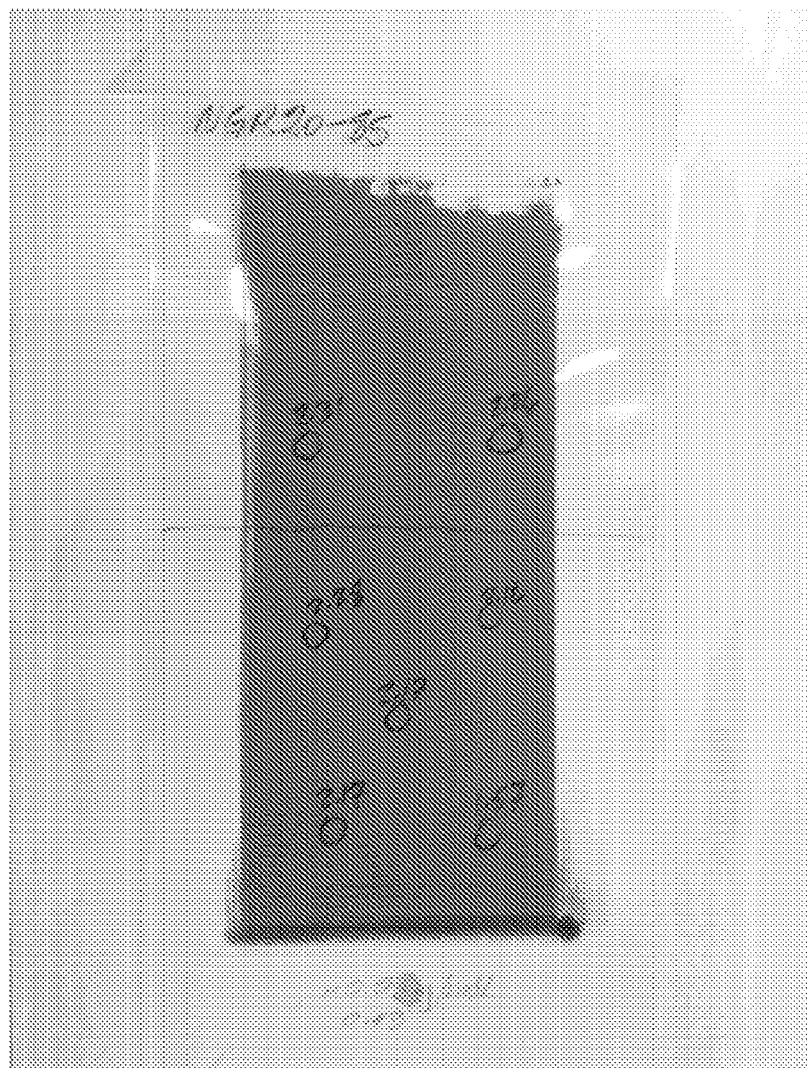
FIG. 2 is a photograph of a similarly coated and treated film as in FIG. 1, but with higher coating weight of the acrylate-polyethyleneimine coating.

For the treated zone, five measurements were made roughly in the pattern of the icons on a playing card (see markings on FIGS. 1 and 2). Representative test locations were selected to avoid obvious drawdown-related anomalies. If the blanket on the Little Joe was not mounted correctly, then ink density also varies over different regions of any given set of drawdowns. Also, silicone drawdowns might not be ideal, and samples that are more sensitive to silicone might also show wider variations in ink density. The locations actually tested for possible future reference were marked.

Ink densities for the untreated area should be between about 1.5 and 2.4 when using the cyan Gemini Flexocure™ ink. Based on a few test cases, the RID value will trend slightly higher if the untreated ink density was higher. If the ink was too thick, then the de-wetting effect was totally obscured.

Step 6: Calculation of the RID. The RID calculation was performed as follows: an average of two density measurements in the untreated area and five density measurements in the treated area were made. The treated average was divided by the untreated average and the raw RID result was reported as a percentage. Replicate tests were generally within 10 to 15%. To compare results from one sample set to the next, it was preferable to normalize the raw RID results to a commercial benchmark like 50 LL534II. The raw RID average for an experimental sample was divided by the raw RID result for 50 LL534II tested on the same day with the same treatment conditions and the same silicone solution. The normalized RID value was reported as a percentage.

The photos in FIGS. 1 and 2 demonstrate how RID improved when the coating weight of the coating in WO 2012-134695 was increased from about 0.02 to about 0.03 g/m². Circled spots indicate where ink density measurements were made that was used in the RID calculation.

Figure 3:
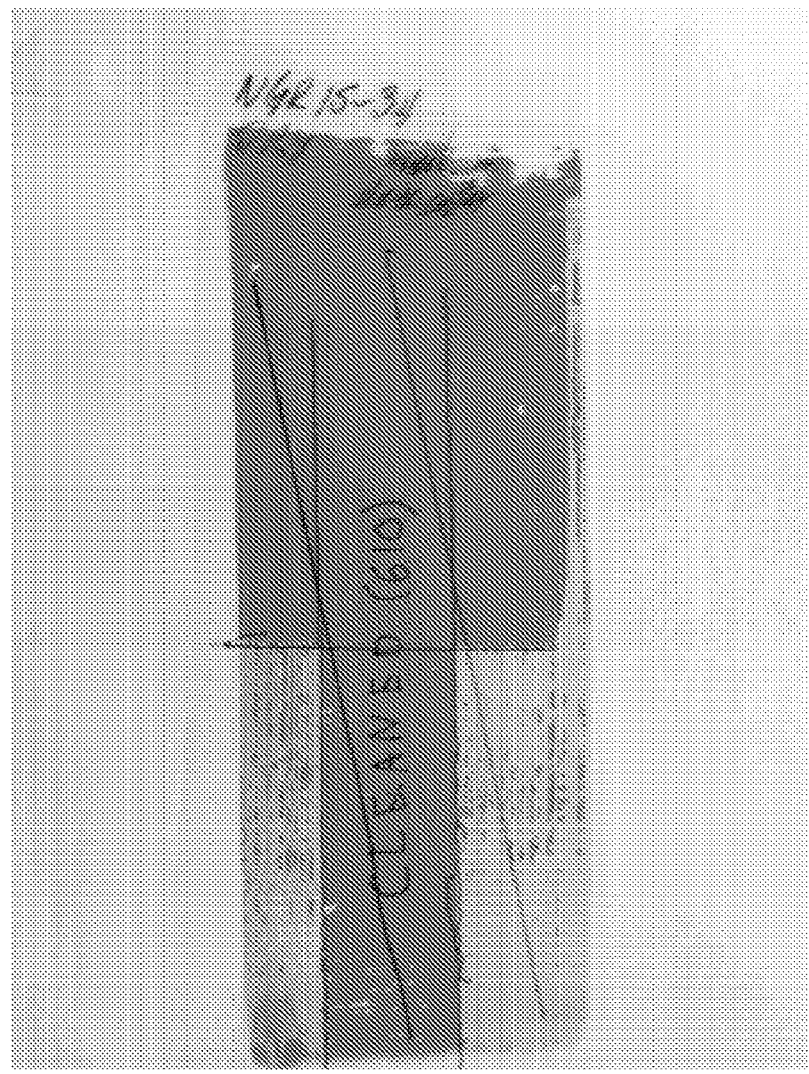
FIG. 3 is a photograph of a similarly treated film, where the silicon has been cleaned from the central strip of the film using adhesive tape, demonstrating that the ink beads up and does not adhere where the silicon remained and was exposed to coronal treatment.

To confirm that the de-wetting issue involved silicone, Scotch™ 610 tape was used to remove surface silicone from the print face of a sample laminated to a silicone release liner. As described above, the sample was passed through the treater with the upper portion covered prior to printing. After printing, ink adhesion was then tested with Scotch 600 tape (shown in angled lanes outlined in black) as shown in FIG. 3. Catastrophic ink de-wetting (low ink density) was seen in zones exposed to corona treatment without having surface silicone removed by tape. Ink adhesion and ink density were excellent in all untreated zones (cleaned or not).

Example 2

The following Table 1 summarizes the design factors and their levels for an L16 Taguchi experimental design, where Denacol EX 171 (lauryl alcohol (EO)15 glycidyl ether from Nagase) was the epoxide compound used, and Epomin P1050 ($M_w$=70,000 polyethyleneimine, from Nippon Shokubai) was the PAI used:

TABLE 1

| Factor | Lowest Level | Lower Level | Higher Level | Highest Level |
|---|---|---|---|---|
| Log MEHQ | 0 | 1 | 2 | 3 |
| [MEHQ ppm] | [1] | [10] | [100] | [1000] |
| AAEM (phr) | 5 | 45 | 85 | 125 |
| [EtOAcAc phr] | [75] | [50] | [25] | [0] |
| Inventive Coating composition | — | 1 [1150 phr Denacol EX171 with EtOAcAc] | 2 [1200 phr Denacol EX171 without EtOAcAc] | — |
| TC Solids (%) | — | 2.5 | 5.0 | — |
| Oven Temp. (° C.) | — | 80 | 130 | — |

In Table 1, "TC" means "top coat" or simply "coating." Coating compositions prepared in this experiment all contained some level of 4-methoxyphenol (MEHQ). This material was added to prevent possible polymerization of AAEM during the substitution reaction. To cover the range of typical usage levels of this polymerization inhibitor, a log-linear set of levels was chosen: 1, 10, 100, and 1000 ppm with log values of 0, 1, 2, and 3, respectively.

The Type 1 coating compositions in the above table contained enough AcAc compounds (acetoacetoxyethyl methacrylate [AAEM] and/or ethyl acetoacetate [EtOAcAc]) to react stoichiometrically with all the available primary amines in Epomin P1050. The highest levels of AAEM (125 phr) and EtOAcAc (75 phr) correspond to the stoichiometric amount of AcAc material needed to react with the primary amines to form enamines. The amount of Denacol EX171, which has one epoxide moiety, was chosen to be stoichiometrically equivalent to the number of available secondary amines in Epomin P1050 that could react with the glycidyl ether.

In the Type 2 coating compositions, no EtOAcAc was used to compensate for primary amines not capped by AAEM. The amount of Denacol EX171 was chosen to be close to the level used in the Type 1 polymers, but different enough so that all sixteen polymers would be unique. Moreover, in the Type 2 polymers the long-chain glycidyl ether could react with primary amines not capped by AAEM.

Coatings were applied using a 550-Quad gravure cylinder on a lab-scale coater. In particular, samples were prepared by coating 5-inch wide film on a Talboys™ lab coater (Talbot's Engineering, Emerson, N.J.). A 550-Quad gravure cylinder with a flooded nip is used to apply coatings to the desired side of the film after in-line corona treatment. The coating is held in a stainless steel pan that can be raised and lowered to ensure that the gravure cylinder remains wet. Coating consumption can be estimated by weighing the pan and the coating before and after coating a known amount of film. The line speed is typically 35-40 feet/min (10.7-12.2 m/min), and the coatings are dried by passing through a four-foot oven set at the desired temperature. Rolls are wound onto cardboard cores that are three inches in diameter. It was found that about 2.5% coating solids will give a dry coating weight of about 0.02 g/m². At 5% solids, the approximate coating weight would be about 0.04 g/m². Oven temperatures were chosen to span possible conditions that are available for drying oriented polypropylene films.

Table 2 ("AcAc" is acetylacetone) describes the formulations for the sixteen coating compositions that were tested in this example. A 20% aqueous solution of Epomin P1050 was used to facilitate faster dispersion of the viscous polymer. Denacol EX171, which is a waxy solid at room temperature, was melted at about 53° C. prior to mixing with the other ingredients. The indicated ingredients were mixed at ambient temperature with a magnetic stirring bar for about eight days before they were coated on a clear, 2-mil base film manufactured by ExxonMobil Chemical Co. (196 MC550). Before coating, the samples were diluted to either 2.5% or 5.0% solids, as required by the experimental design matrix, and then applied to the base film at about 40 fpm with a 550-Quad gravure cylinder using the direct gravure process. In-line corona treatment was used to facilitate coating wetout, and the coatings were dried at either 80° C. or 130° C., in the coater oven that was about 4 feet long.

TABLE 2

Sample coating compositions of Epomin P1050 at 20% solids, with total solids of 10% in the emulsion

| Sample No. | 20% Epomin, g | AAEM, g | 1% MEHQ, g | Denacol EX171, g | EtOAcAc, g | H₂O, g | Total, g | Epomin, phr | AAEM, phr | MEHQ, phr | Denacol EX171, phr | EtOAcAc, phr | Total phr |
|---|---|---|---|---|---|---|---|---|---|---|---|---|---|
| 1 | 11.3 | 0.11 | 0.03 | 25.94 | 1.7 | 260.9 | 300 | 100 | 5 | 0.01 | 1150 | 75 | 1330.01 |
| 2 | 11.2 | 1.00 | 0.03 | 25.65 | 1.1 | 261.0 | 300 | 100 | 45 | 0.01 | 1150 | 50 | 1345.01 |
| 3 | 10.8 | 1.84 | 0.03 | 25.99 | 0.0 | 261.3 | 300 | 100 | 85 | 0.01 | 1200 | 0 | 1385.01 |
| 4 | 10.5 | 2.63 | 0.03 | 25.26 | 0.0 | 261.6 | 300 | 100 | 125 | 0.01 | 1200 | 0 | 1425.01 |
| 5 | 11.3 | 0.11 | 0.30 | 25.94 | 1.7 | 260.7 | 300 | 100 | 5 | 0.14 | 1150 | 75 | 1330.14 |
| 6 | 11.2 | 1.00 | 0.31 | 25.65 | 1.1 | 260.8 | 300 | 100 | 45 | 0.14 | 1150 | 50 | 1345.14 |
| 7 | 10.8 | 1.84 | 0.30 | 25.99 | 0.0 | 261.0 | 300 | 100 | 85 | 0.14 | 1200 | 0 | 1385.14 |
| 8 | 10.5 | 2.63 | 0.30 | 25.26 | 0.0 | 261.3 | 300 | 100 | 125 | 0.14 | 1200 | 0 | 1425.14 |
| 9 | 11.5 | 0.11 | 3.00 | 27.56 | 0.0 | 257.8 | 300 | 100 | 5 | 1.31 | 1200 | 0 | 1306.31 |
| 10 | 11.1 | 1.00 | 3.00 | 26.74 | 0.0 | 258.1 | 300 | 100 | 45 | 1.35 | 1200 | 0 | 1346.35 |
| 11 | 11.0 | 1.87 | 3.00 | 25.34 | 0.6 | 258.2 | 300 | 100 | 85 | 1.36 | 1150 | 25 | 1361.36 |
| 12 | 10.9 | 2.72 | 3.00 | 25.07 | 0.0 | 258.3 | 300 | 100 | 125 | 1.38 | 1150 | 0 | 1376.38 |
| 13 | 11.4 | 0.11 | 30.01 | 27.31 | 0.0 | 231.2 | 300 | 100 | 5 | 13.2 | 1200 | 0 | 1318.19 |
| 14 | 11.0 | 0.99 | 30.00 | 26.50 | 0.0 | 231.5 | 300 | 100 | 45 | 13.6 | 1200 | 0 | 1358.59 |

TABLE 2-continued

Sample coating compositions of Epomin P1050 at 20% solids, with total solids of 10% in the emulsion

| Sample No. | 20% Epomin, g | AAEM, g | 1% MEHQ, g | Denacol EX171, g | EtOAcAc, g | $H_2O$, g | Total, g | Epomin, phr | AAEM, phr | MEHQ, phr | Denacol EX171, phr | EtOAcAc, phr | Total phr |
|---|---|---|---|---|---|---|---|---|---|---|---|---|---|
| 15 | 10.9 | 1.86 | 30.01 | 25.11 | 0.5 | 231.6 | 300 | 100 | 85 | 13.7 | 1150 | 25 | 1373.74 |
| 16 | 10.8 | 2.70 | 30.00 | 24.84 | 0.0 | 231.7 | 300 | 100 | 125 | 13.9 | 1150 | 0 | 1388.89 |

Figure 4:
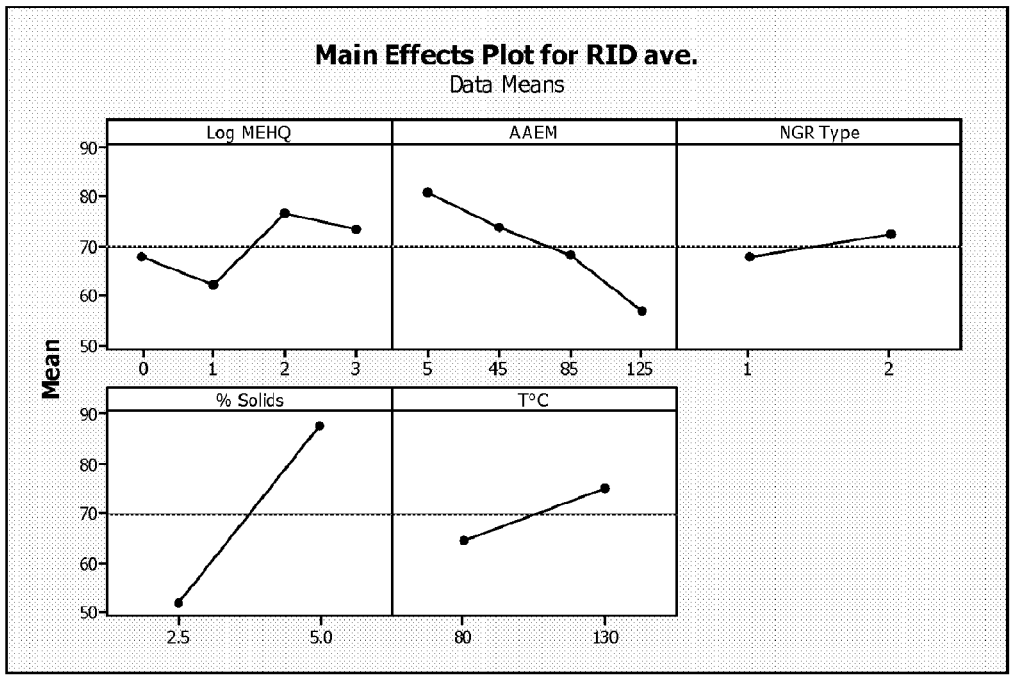
FIG. 4 are graphical representations of how RID is influenced by various parameters shown in Table 1, where "NGR" is the inventive sample of Table 1, where the heading of each graph represents the y-axis.

In FIG. 4, y-axis units are in the headings of each graph: "log 10 MEHQ" is the concentration of MEHQ in the wet coating; "AAEM" is the phr of AAEM used in the polymer synthesis; "NGR Type" means that EtOAcAc was used to compensate for reduction in the acetoacetoxy functionality (or not) as the AAEM level was changed; "% Solids" describes the solids content of the coating formulation when it was applied and since the same gravure cylinder is used for the entire experiment the dry coating weight will change roughly in proportion to the solids content of the coating; "T° C." is the drying temperature in ° C. that was used to dry the coating in the oven.

Figure 5:
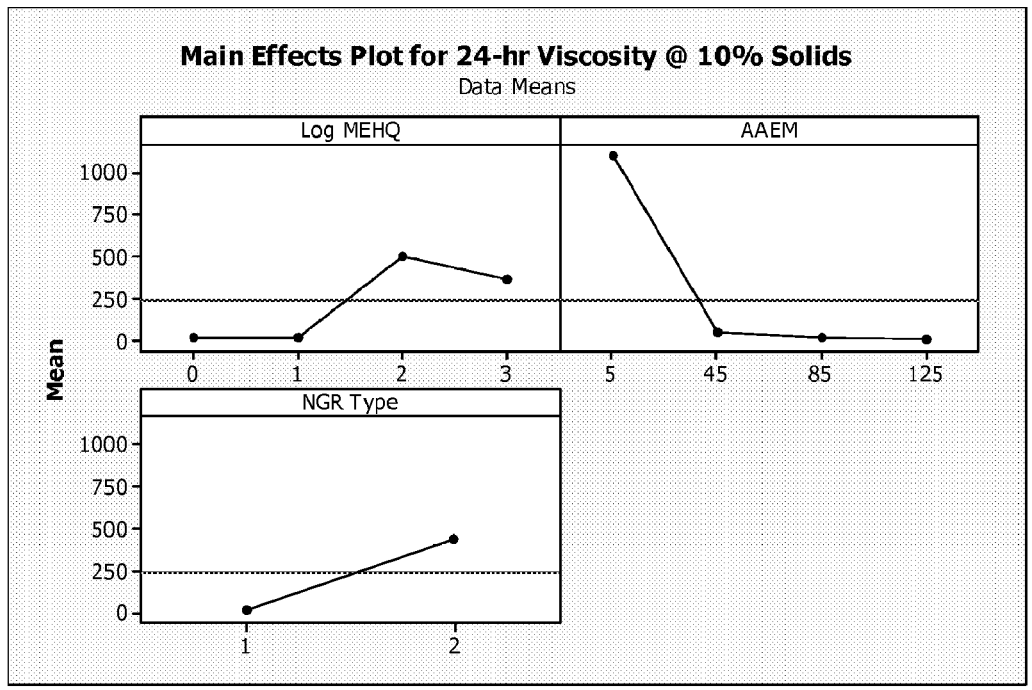
FIG. 5 are graphical representations of how the viscosity of the inventive and prior art coatings are influenced by various levels of ingredients, where "NGR" is the inventive sample of Table 1, where the heading of each graph represents the y-axis.

About three weeks after the samples were coated (samples were kept at ambient temperature), the RID test described in Example 1 was used to assess the effects of silicone exposure and corona treatment on the different combinations of coating compositions. The plots in FIGS. 4 and 5 were obtained for main effects.

Statistical regression shows only two statistically significant responses: the amount of AAEM (P=0.001) and percent (%) solids (P=0.000). Therefore, there is a benefit for the inventive coating composition in not having ethenic unsaturation such as the coatings described in WO 2012-134695 and PCT/US2012/035977. Note that if long-chain, ethoxylated glycidyl ethers are included in the inventive reaction product and coating, good RID values can be obtained, even in the presence of ethenic unsaturation if the printable coating was thick enough. This could be useful, because including some amount of acetylacetone (AcAc) material in the reaction helps to reduce the viscosity of the aqueous coating composition, which could make it easier to process on a coater. The plot in FIG. 5 graphically demonstrates the effect of varying polymer viscosity (at 10% solids) as a function of the composition. Centipoise (cP, at 25° C.) are the units of viscosity used in FIG. 5. Generally for gravure-based processes, lower viscosities are preferred. While gravure cylinders and process equipment can be designed to handle a very wide range of viscosities, coatings with viscosities that are less than 500 cP are preferred, more preferably less than 100 cP, and very commonly less than 20 cP (25° C.).

All Type 1 polymers (theoretically having all primary amines capped with an AcAc compound) had viscosities that were less than 30 cP. The mean viscosity for the Type 2 coating compositions was less than 400 cP. Including as little as 45-phr AAEM in the formulation (enough to cap roughly one-third of the primary amines), was enough to lower the mean viscosity from about 1100 cP to less than 50 cP.

Example 3

This example demonstrates preparation of a wide range of embodiments for preparation of inventive coating compositions. In summary, phase differentiation causes large variations in viscosity versus Denacol loading; coating composition viscosity passes through a minimum at 1150 phr Denacol EX171 per 100 phr Epomin P1050.

Figure 6:
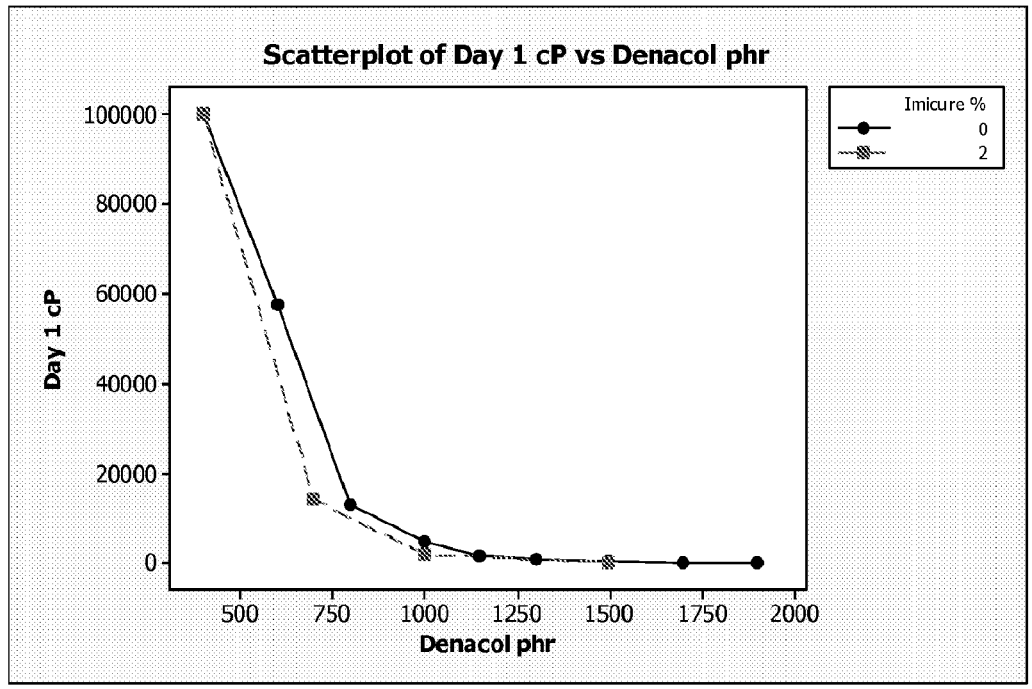
FIG. 6 is a graphical representation of the viscosity on day 1 as a function of the level of Denacol™ in the reaction mixture.
Figure 7:
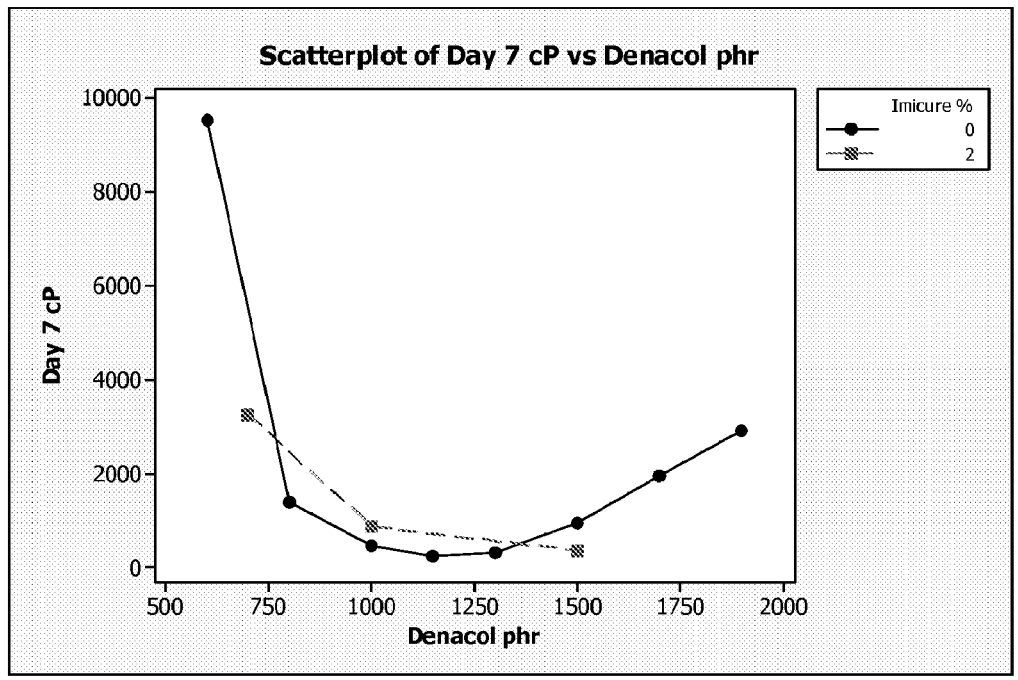
FIG. 7 is a graphical representation of the viscosity on day 7 as a function of the level of Denacol™ in the reaction mixture.

Several coating compositions were synthesized at 10% solids that contained only a PAI (Epomin P1050), a long-chain, ethoxylated glycidyl ether (Denacol EX171), and water. A few of the substitution reactions also contained an optional epoxy curing catalyst (Imicure™ EMI-24 from Air Products) at 2% of the sum of Denacol EX171 and Epomin P1050. One day after starting the inventive reactions at ambient temperature, the following viscosities were measured at the various Denacol levels (per 100 phr Epomin P1050) as shown in FIG. 6. However, after the blends aged for a week at room temperature, the shape of the profile as shown in FIG. 7 changed significantly. Note that gelled batches (≥100,000 cP) were not re-tested.

The plot for the week-old ambient-aged samples (FIG. 7) shows that viscosity passes through a minimum at 1150 phr Denacol EX171, which corresponds to the capping of about one-half of the available amine hydrogens in Epomin P1050. The batch of Denacol EX171 used in this study had an epoxy equivalent weight of about 990 g/eq. Emulsions with less than or equal to 1300 phr Denacol EX171 appear to have relatively stable viscosities after additional aging beyond a week. Samples having between 700 and 1500 phr Denacol EX171 that were catalyzed with about 2% Imicure EMI-24 continued to build viscosity. The sample made with 1500 phr Denacol eventually separated into a mixture that was one-third liquid on top and two-thirds gel on the bottom. Samples with more than 1500 phr Denacol EX171 looked more like semi-solutions than emulsions.

It was found that the substitution reaction could be accelerated at elevated temperature. A separate set of reactions were prepared with 10, 31.6, and 100 phr Denacol EX171 (per 100 phr Epomin P1050) at 8% solids. These samples were incubated in a hot room (53° C.) for about 40 hours. Once the samples were cooled to room temperature, the viscosities were measured at 94.5, 11,400, and greater than 100,000 cP (gel), respectively. All three polymer samples in this set were essentially solutions with little or no turbidity.

Once the components were initially mixed, the substitution reaction proceeds smoothly and phase changes occur spontaneously, even in the absence of agitation, regardless of temperature. By conducting the substitution reaction at elevated temperature, high in-process viscosities can often be avoided (which can slow or stop diffusion of the reactants). Coating compositions can also be synthesized at lower solids content (for example, 3% or 5% solids) if the polymer dispersion turns out to be too viscous at higher solids. Use of a PAI with lower molecular weights can help to reduce dispersion viscosities and allow coating compositions to be produced at solids levels of at least 10% solids.

Phase changes account for the viscosity data. The reaction mixtures start as water-soluble solutions (less than 20 cP). At less than 100 phr Denacol EX171, the reactants and the product are still water soluble, although the increase in molecular weight causes a rapid rise in viscosity. Increasing Denacol EX171 content from 100 phr to about 1150 phr yields aqueous polymer dispersions that are increasingly emulsion-like:

they become more turbid and eventually opaque. Polymer solution character decreases in this range. Increasing the amount of Denacol EX171 beyond 1150 phr starts to yield a reaction product that was increasingly water soluble, and the viscosity starts to build again and the turbidity of the final mixture visibly decreases.

When coated at a weight of at least 0.03 g/m$^2$ according to conditions in Example 1 (but dried at 100° C.), samples comprising at least 1150 phr Denacol EX171 per 100 phr Epomin P1050 all had excellent RID values (greater than 90%). Samples coated at about 0.02 g/m$^2$ yielded similar RID results if the coating composition contained between 10- and 1000 phr Denacol EX171. Samples coated at 0.01 g/m$^2$ that contained between 100 phr and 800 phr Denacol EX171 showed RID values that were also at least 90%. Therefore, coating compositions comprising 100 phr Epomin P1050 and between 100- and 800 phr Denacol appear to offer the most robust printability after coming in contact with silicone.

Example 4

This Example demonstrates the effect of the level of substitution of the coating composition on print durability after exposure to water. To simulate print performance in the first station of a multi-station printing press, samples were printed with ink on test surfaces that had no prior exposure to UV light followed by two passes under the UV lamp to cure the ink. This is the "0-Ink-2" curing protocol. The effect of too much Denacol was visible in samples cured with the 0-Ink-2 printing protocol. Each pass under the UV lamp typically exposed the sample to an energy equivalent that was between 0.09 and 0.12 Joules/cm$^2$.

Figure 8:
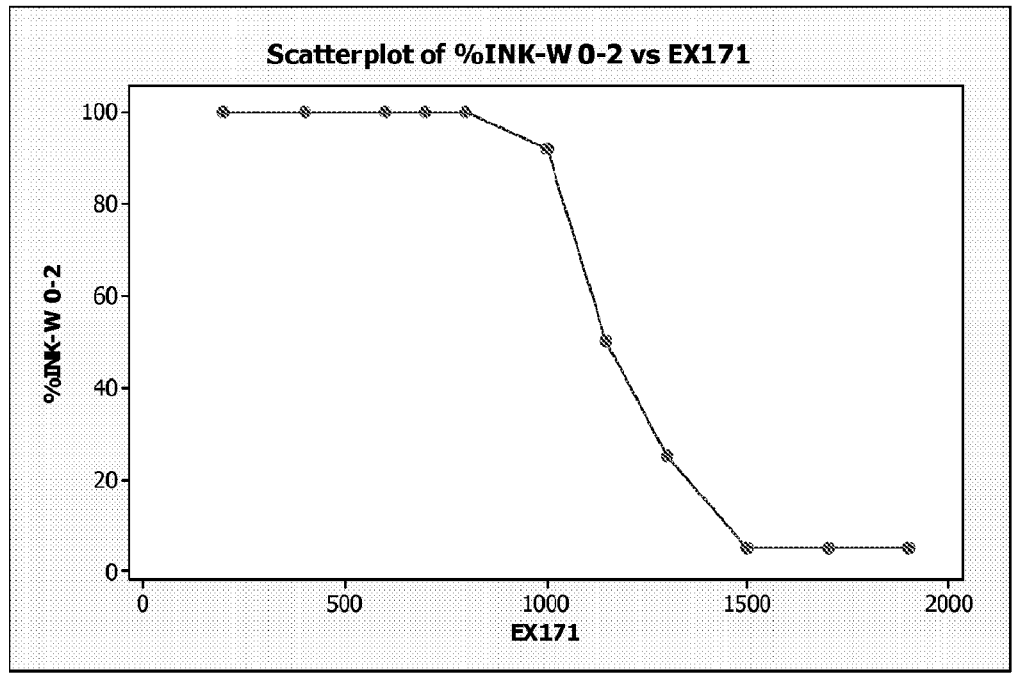
FIG. 8 is a graphical representation of the % INK-W 0-2 as a function of the level of Denacol (glycidyl ether) added.

After performing the RID test, samples were immersed in deionized water overnight. After the printed surface was quickly dried with a paper towel, retained ink adhesion (% INK-W) was tested with Scotch 600 tape. The plot in FIG. 8 shows results for samples coated with coating compositions from this invention having the indicated level of Denacol EX171 per 100 phr Epomin P1050. The plot in FIG. 8 shows that when the amount of Denacol EX171 exceeds 800 phr per 100 phr Epomin P1050, % INK-W starts to drop sharply.

Figure 9:
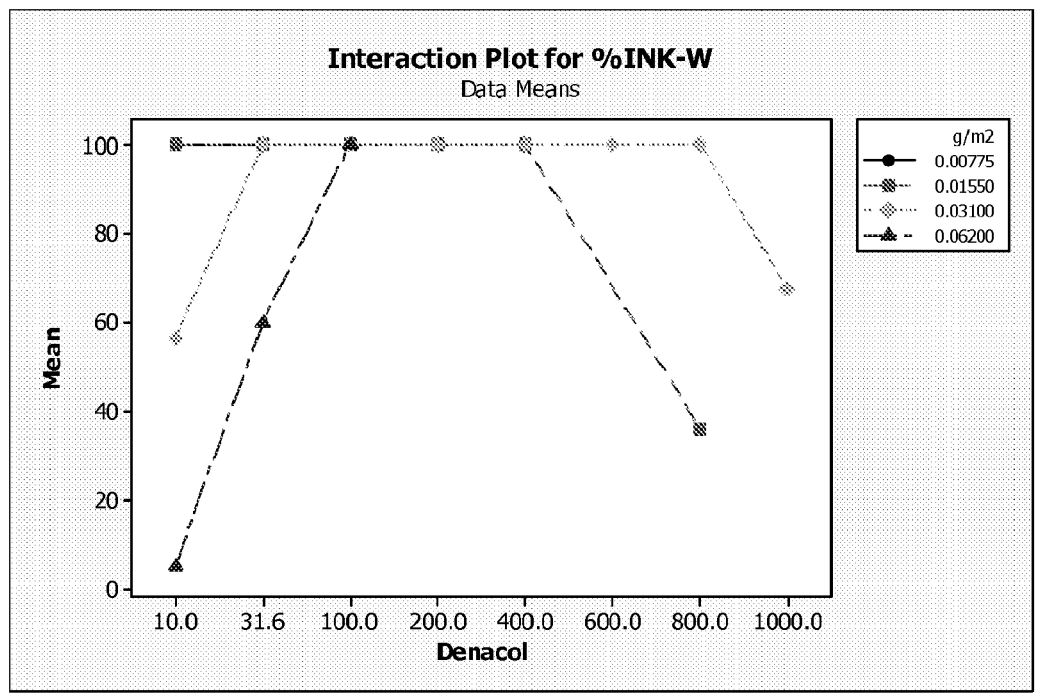
FIG. 9 is a graphical representation of the % INK-W 0-2 as a function of the level of Denacol (glycidyl ether) (phr) added to the reaction mixture for various coating weights on the film.
Figure 10:
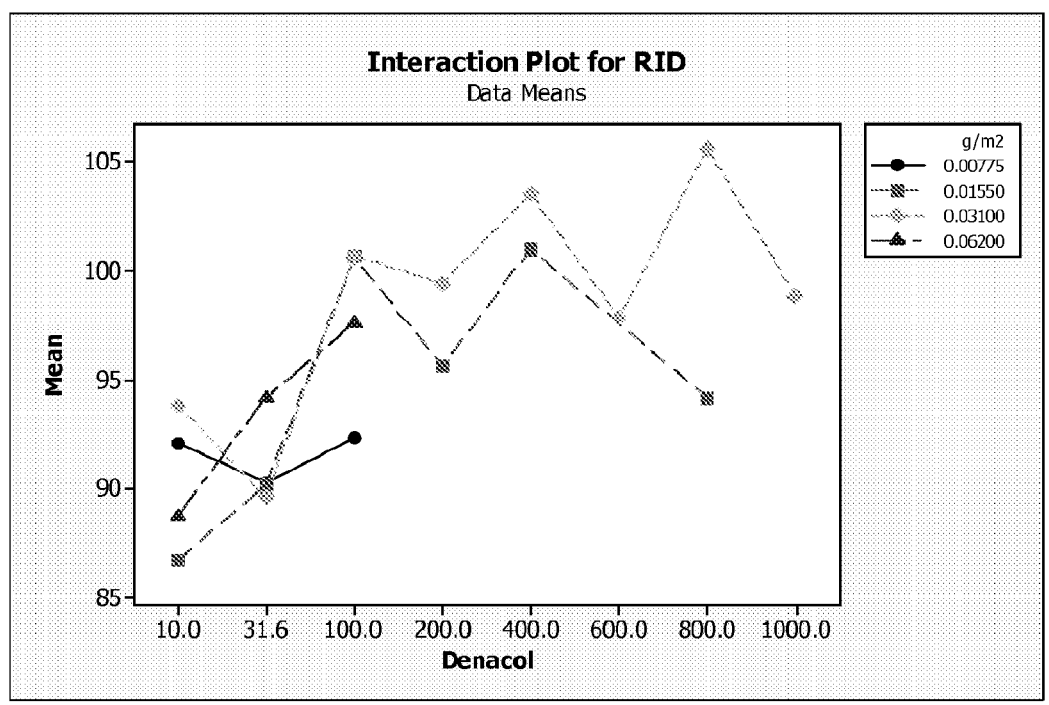
FIG. 10 is a graphical representation of the RID as a function of the level of Denacol (glycidyl ether) added to the reaction mixture at various coating weights on the film.

Samples were prepared containing between 10 phr and 1000 phr Denacol EX171 and applied at a variety of coating weights to determine a range of compositions and coatings weights that had the best print durability after exposure to water. The same set of samples was also tested for relative ink density after contact with silicone (RID). The plots in FIGS. 9 and 10 show the outcome.

The trends indicate that water resistance was significantly degraded if the coating weight was too high in samples made with less than 100 phr Denacol EX171. However, for samples made with more than 400 phr Denacol EX171 the trend reverses, as shown by samples made with 800 phr Denacol EX171 in which samples coated at 0.031 g/m$^2$ had better retained ink adhesion than samples coated at 0.0155 g/m$^2$. Therefore, the compositions that offer the most latitude with respect to print durability as a function of coating weight comprise between 100 phr and 600 phr Denacol EX171 per 100 phr Epomin P1050. RID values were also at least 95% in this range, which was quite acceptable. However, due to the viscosities described in Example 3, coating compositions having a Denacol EX171/Epomin P1050 ratio between about 4 and 6 are generally preferred. If emulsions in this range are prepared at between 5 and 8% solids, then desirable emulsion viscosities of less than 500 cP were obtained. These emulsions can then be easily diluted to achieve coating weights between about 0.01 and 0.03 g/m$^2$, which will yield excellent printability and print durability, even after being exposed to silicone-based release liners.

According to data published by Nippon Shokubai (www-.shokubai.co.jp/en/products/functionality/epomin2), Epomin P1050 has 25% primary and tertiary amines and 50% secondary amines. Therefore, the average amine hydrogen equivalent weight was 43 g/eq. According to the certificate of analysis provided by Nagase, the lot of Denacol EX171 used in this experiment had an epoxy equivalent weight (EEW) of 990 g/eq. Though Epomin P1050 has an equal number of primary and secondary amine hydrogens initially (primary amines have two reactive hydrogens and secondary amines only have one), once a primary amine reacts a first time, it becomes a secondary amine. Therefore, in terms of reactivity, one-third of the amines on Epomin P1050 can behave as primary amines, and two-thirds can behave as secondary amines. Since primary amines are more reactive that secondary amines, the reaction between the glycidyl ether of the ethoxylated alcohol will be with the primary amines in the PAI polymer.

Based on stoichiometry, a reaction between 100 phr Epomin P1050 and 800 phr Denacol EX171 would consume 35.1% of the reactive amine hydrogens. Since 33.3% of the reactive amine hydrogens are on primary amines, this level of Denacol EX171 was just enough to consume all the primary amine hydrogens. It was observed that % INK-W values start to decline at lower coating weights at 800 phr Denacol EX171. Therefore, one could make calculations that could extend to other types of PAI that could have different branching properties than Epomin P1050.

At 100 phr Denacol EX171, about 4.4% of the reactive amine hydrogens are consumed. This corresponds to about 13% of the available primary amine hydrogens. At this level, water resistance as a function of coating was robust, as was tolerance to silicone. Therefore, the preferred level of epoxide compound of the coating compositions should contain enough glycidyl ether, of the type described in this invention, to react with between 10 and 100% of the available primary amine hydrogens. Factoring in issues with emulsion viscosity, more preferred coating compositions would contain enough glycidyl ether to consume between 40 and 100% of the available primary amine hydrogens. Most preferred formulations would contain enough glycidyl ether to consume between 50 and 90% or even between 60 and 80% of the available primary amines.

Example 5

This example distinguishes blocking (the adhesion of the film to itself or another similar film) tendencies between ethoxylated PAI, which does not contain glycidyl ethers with a hydrophobic chain, and a coating composition prepared according to this invention.
Polymer 1:
Polyethylene imine, 80% ethoxylated (weight average molecular weight ($M_w$) 70,000) was purchased from Sigma-Aldrich as a 37.8% aqueous solution. This polymer was the reaction product of polyethylene imine and ethylene oxide ($C_2H_4O$) such that about 80% of the primary and secondary amines become hydroxyethylated ($R_2NCH_2CH_2OH$, where "R" is the polymer backbone).
Polymer 2:
A coating composition was prepared according to this invention by mixing 13.3 g Epomin P1050 (pre-diluted to 20% solids with deionized water to make dispersion easier, $M_w$=70,000, 100 phr), 173.3 g deionized water, and 13.3 g Denacol EX171 (lauryl alcohol [EO]15 glycidyl ether, 500 phr). After all the components were completely dissolved in water, the reaction mixture was placed in an oven for three days at 53° C. without agitation. The solids content of the resulting emulsion was 8% and the viscosity was 363 cP when it was cooled to room temperature (about 23° C.).

Coated Structures.

Three coated structures were prepared using the above polymer solutions.

Both polymers were diluted to 0.5% solids with deionized water and applied to 196 MC550 film obtained from Exxon-Mobil Chemical Co. using a 130-Quad gravure cylinder at 40 fpm, as described in an earlier example. The base film was corona treated in line, as described in another example, to facilitate coating laydown. The coatings were dried at 100° C., which yielded an approximate coating weight of 0.03 g/m$^2$.

Roll #1:

A roll was prepared in which both sides of the substrate were coated with Polymer 1. After coating one side of the substrate with Polymer 1, the roll was sent through the coater again, such that the second side of the substrate was also coated with Polymer 1 under the same conditions. The finished roll had about 100 wraps (or layers) of film on the roll (approximately 90 to 100 linear feet).

Roll #2:

A roll was prepared in which only one side of the substrate was coated with Polymer 1, but the second side was corona treated at the same level that was used during the coating step. Some roll stock laminators prefer to have an uncoated, but treated surface on the adhesive-receiving side. This sample was prepared by corona treating one side of the film during the first pass through the small coater (without engaging the coating station). When the film was sent through the coater again, the second side was corona treated and coated with Polymer 1. The finished roll also had about 100 wraps (or layers) of film on the roll (approximately 90 to 100 linear feet).

Roll #3:

During the first pass through the coater, Polymer 1 was applied to the substrate. On the second pass through the coater, Polymer 2 was applied to the opposite side. This finished roll also had about 100 wraps (or layers) of film on the roll (approximately 90 to 100 linear feet).

Blocking Results.

All three rolls were kept at ambient conditions (about 23° C., about 40-50% RH) for twelve days. After that time, it was attempted to unwind the small rolls using the unwinding and rewinding stations on the coater (no coatings were in the station and the oven was off). Ideally, the coated rolls should unwind all the way down to the core without affecting the clarity of the coated surfaces. The number of wraps taken off each roll was recorded as a way to quantify the blocking response and summarized in Table 3.

TABLE 3

| Sample | Wraps Removed | Comments |
|---|---|---|
| Roll #1 | 0 | Blocking was very bad, when the line was started at about 40 fpm, the web broke almost instantly before even one complete wrap could be removed. |
| Roll #2 | 5 | Only about five wraps were removed before the web broke. In the wraps that were removed, the coated surface was disrupted as evidenced by hazy patterns on what was originally a very clear and uniform surface. |
| Roll #3 | >100 | This roll unwound completely with little or no hissing. Film that was at the core of the aged roll looked as good as film removed from the outside of the roll. |

Results from this example show that polymers prepared according to this invention have excellent block resistance, even if paired against a coating with very strong blocking tendencies.

Ethoxylated PEI was very printable and resistant to solvents (when thin layers are applied to treated polyolefin films). It could make a useful coating for the print surface or the adhesive-receiving surface. However, the blocking tendencies of ethoxylated PEI limit its utility in structures that require a treated surface or a coated surface on the opposite side of the film. However, a blend of ethoxylated PEI with substitution polymers from this invention can be used to fine tune the balance of coating properties, since Polymer 1 was water soluble (hydrophilic) and Polymer 2 was not water soluble (hydrophobic).

Example 6

This example provides further evidence of the excellent block resistance offered by different structures prepared using the coating composition from this invention. In this example, coated film samples were prepared on a larger coater, and slit rolls were exposed to harsher conditions than in the prior example.

Coating Formulation.

The following ingredients were mixed in a 2-gallon pail liner using a football-shaped magnetic stirrer to make sample coating compositions. When all the components were dissolved after about 30 minutes of mixing, the contents were transferred to two half-gallon plastic jugs and placed in a hot room (53° C.) for about 24 hours:

| | |
|---|---|
| Epomin P1050 (diluted to 20% solids, 100 parts) | 169.0 g |
| Deionized water (for 8% total solids) | 2624.8 g |
| Imicure EMI-24 (10 parts) | 3.4 g |
| Denacol EX171 (600 parts) | 202.8 g |

After removing the jugs of emulsion from a hot room, they were allowed to cool to room temperature overnight. The resulting emulsion was diluted to 0.6% solids on the day of the run to create TC1. Under the conditions of the experiment, TC1 yielded an approximate coating weight of 0.03 g/m$^2$ on a pilot-scale coater equipped with a pre-coat station and oven and a reverse-direct gravure topcoat station and oven:

Line speed: 175 fpm;
Gravure cylinders:
Topcoat station: 120-lpi ceramic
Primer Station: Not used; nip kept open.
Gravure speed:
Print-face topcoat: 175 fpm (in the direction opposite to that of the moving web)
Primer: NA
Gravure cooling: Set at about 50-55° F.
Primer oven set point: 150° C. (to maintain web flotation)
Topcoat oven set point: 212° F. (100° C.)
Corona Treater Power: 1.0 kW Coated Structures.

The following Table 4 describes the samples that were prepared on a clear, 2-mil substrate (196 MC550 from ExxonMobil Chemical Co. that was 26 inches wide). The coated surface always ends up on the outside of the finished roll. Therefore, for samples coated and/or treated on both sides, the inside of an in-process roll was coated and/or treated on the second pass through the coater.

TABLE 4

| Sample Being Made | Input Film | Side to Coat | Primer | Top-coat | Footage |
|---|---|---|---|---|---|
| Roll 2-1 | 196 MC550 | Inside | None | TC1 | 2625 ft. (15 min) |
| In-process roll #1 | 196 MC550 | Inside | None | TC1 | 2975 ft. (17 min) |
| In-process roll #2 | 196 MC550 | Inside | None | TC1 | 2975 ft. (17 min) |
| Roll 2-2 | In-process roll #1 | Inside | None | TC1 | 2625 ft. (15 min) + Full Slab |
| Roll 2-3 | In-process roll #2 | Inside | None | None | 2625 ft. (15 min) + Full Slab |

In summary, Roll 2-1 was coated on one side, with no coating or treatment on the second side. Roll 2-2 was symmetrically treated and coated with TC1 on both sides. Roll 2-3 was coated with TC1 on one side and corona treated, but not coated, on the second side. Note, with no coating stations closed on the second pass (used to corona treated the uncoated surface), Roll 2-3 had some wrinkles wound into the roll, because tension control was difficult.

Slitting.

Each 26-inch wide roll was slit into one 15-inch wide roll and two rolls that were 4.75 inches wide. During the slitting operation, rolls were wound so that the coated surface intended for printing ended up on the outside of the slit roll. A Dusenbery ribbon slitter was used.

In-Roll Blocking Assessment.

One of the small slit rolls was used to assess in-roll blocking after a week of conditioning at 50° C./50% RH. For consistency, small rolls taken from the north edge of the master roll were used for the blocking assessment. Samples were in the tropical conditioning cabinet for seven days. After the samples were removed from the conditioning cabinet, the rolls were kept at ambient conditions for three days before they were rewound on the Dusenbery ribbon slitter to assess blocking tendencies.

The static field was also measured on the unwinding roll with a Simco Hand-E-Stat electrostatic field meter. Haze values of film near the core of the conditioned slit roll were compared with haze measured in the slab that was taken right off of the master roll when it was first prepared on the pilot-scale coater.

To get a general idea of the blocking force near the core, the end of the film was secured, and the core (with layers of film amounting to less than 0.25 inches remaining on the core) was dropped into a barrel. The qualitative rate at which the core drops (not at all, slow, moderate, fast, or very fast) was taken as a factor in assessing the blocking rating. In some instances, film can be rolled off of the core merely by rotating the core: Such samples would have a '0' blocking rating ("R" value). The results are summarized in Table 5. Ambient conditions during rewinding were used: 73±1° F., 44% RH.

Another consideration in rating the blocking was the appearance of the coating near the core. Patterned variations in coating haze (called 'mottling') can be caused by sticking at points of imperfection near the core of the roll (e.g. over tape used at the start of the roll, helical ribs from the cardboard core, or other imperfections on the core). Coatings free of mottling are very block resistant. Coatings susceptible to mottling are less so. Unwind speeds are typically about 500 feet/min. The following Table 5 summarizes the responses. In general, samples having rating values of R less than 1.0 are quite acceptable for this severe test.

TABLE 5

| | | | Conditioned at 50° C./50% RH for seven days | | | |
|---|---|---|---|---|---|---|
| Sample | Initial Haze | Core Haze | Outside Static (kV) | Mid-roll Static (kV) | Core Static (kV) | Comments (Blocking Rating = R) |
| Roll 2-1 | 1.59 | 1.46 | >−20 [No hissing] | −18 [No hissing] | >+20 [No hissing] | R = 0.25. Static cling prevented film from rolling off of core. No mottling or patterns near core. |
| Roll 2-2 | 1.44 | 1.29 | −9 [No hissing] | −13 [No hissing] | −4 [No hissing] | R = 0.25. Like 2-1. |
| Roll 2-3 | 1.65 | 1.55 | >+20 [No hissing] | >+20 [Sl. hissing coinciding with a walking wrinkle] | >+20 [Sl. hissing coinciding with a walking wrinkle] | R = 0.25. Like 2-1 except in the wrinkled spots caused by poor tension control on the Pilot Coater. |

As shown above, blocking tendencies were extremely low for all three structures. Unlike ethoxylated PAI (in Example 5), coating compositions prepared according to this invention do not block strongly to themselves or to uncoated surfaces (with or without corona treatment). Besides low unwinding force, coating haze was not adversely affected near the core of conditioned slit rolls, and the coated surfaces were free of mottling.

Example 7

Certain samples from Example 6 were laminated and printed upon to demonstrate their utility. The 15-inch wide wrinkle-free samples from Additional Example 6 were laminated to a pre-siliconized liner coated with a permanent adhesive from Hexion Chemical Company (Synthebond™ 7701) by Polymeric Converting. For Roll 2-1 the uncoated adhesive-receiving surface was corona treated immediately prior to coming in contact with the permanent adhesive. Since Roll 2-2 was symmetrically coated, no on-line corona treatment of the label face stock was necessary. The coating weight for the adhesive was about 15 g/m². Pressure at the laminating nip was kept at 30-35 psi. Winding tension was kept between 8-10 lbs for the 15-inch web.

After the laminations were slit down to a width of 13 inches, they were printed with Actega™ cyan process ink on a Mark Andy UV printing press equipped with a Harper 1000 lpi 394 Anilox roll (1.8 bcm) and a Kodak™ NXH flexographic test printing plate having a wide range of font sizes and dot densities. To compare the quality of the ink laydown, ink density was measured with an X-Rite™ 500 Series spectrodensitometer (from X-Rite, Inc., Grandville, Mich.) in small print blocks on the test pattern having 100%, 70%, or 50% dot density. A commercially available clear PSL film (155 LL534 II from ExxonMobil Chemical Co.) was included as a benchmark. Ink adhesion was measured with Scotch 600 tape.

Since some converters use on-press corona treatment to mitigate the effects of silicone from pre-siliconized liners that gets transferred to the print surface, samples were printed at 300 fpm on the press with and without on-press corona treatment. Another set of samples was printed at 500 fpm without corona treatment. Table 6 summarizes the results.

The results show that samples made with coating compositions from this invention that were laminated to a pre-siliconized PET liner printed as well as the commercially available benchmark. Note, however, that slit rolls of 50 LL534 II film would show unacceptably high blocking levels if they were exposed to 50° C./50% RH for a week. As demonstrated in Example 2, samples made with coatings containing ethenic unsaturation would have shown considerably lower ink densities under similar circumstances.

blend". Using a custom-built pilot-scale coater having a station to apply and dry a primer via an offset roll and a topcoat station that applies coating via reverse direct gravure, a structure was prepared in which a block-resistant adhesive-receiving "acrylic-ionomer blend" was applied at 0.30 g/m$^2$ to one side of primed Label-Lyte 196 LL B2 from ExxonMobil Chemical Co. that comprised 100 parts MichemPrime™ 4983.15 (Michelman, Inc.), 70 parts NeoCryl™ XK90 (DSM NeoResins), Ludox™ AS40 (Grace Davison), 15.6 parts AZCote™ 5800M (Akzo Nobel), MichemLube™ 215 (Michelman, Inc.), Multifex-MM™ (Specialty Minerals, Inc.), 0.3 parts Tergitol™ 15S9 (Union Carbide), and 5 ppm Foamaster™ 223 (Cognis). The topcoat was dried at 175° F.

The primer beneath the adhesive-receiving coating was Mica H760A (a polyethyleneimine dispersion in water) applied at a thickness that yielded an optical density of between 0.060 and 0.065 when measured at 510 nm with a Radiachromic Reader (Far West Technology, Inc.) after a piece of Label-Lyte 196 LL B2 coated only with the primer

TABLE 6

| Sample ID Test | No-retreat Cyan Adhesion 600 tape 300 fpm | No-retreat Cyan Density 100/70/50 | | | Retreat 20% Cyan Adhesion 600 tape 300 fpm | Retreat 20% Cyan Density 100/70/50 | | | No-retreat Cyan Adhesion 600 tape 500 fpm | No-retreat Cyan Density 100/70/50 | | |
|---|---|---|---|---|---|---|---|---|---|---|---|---|
| CONTROL SAMPLE | | | | | | | | | | | | |
| 155LL534-II | 100% | 1.60 | 1.03 | 0.69 | 100% | 1.62 | 1.00 | 0.66 | 100% | 1.55 | 1.01 | 0.64 |
| Pilot Coater Samples | | | | | | | | | | | | |
| Roll 2-1 | 100% | 1.69 | 0.99 | 0.68 | 100% | 1.75 | 1.01 | 0.65 | 100% | 1.46 | 1.02 | 0.72 |
| Roll 2-2 | 100% | 1.40 | 1.00 | 0.74 | 100% | 1.64 | 1.07 | 0.74 | 100% | 1.53 | 1.01 | 0.72 |

Comparative Example 8

Comparative Examples 8 and 9 are used to compare to inventive Example 10 to demonstrate the usefulness of the invention when a film has been in contact with silicone. High-performance label films in the industry usually have one side designated as the printable surface and the opposite side designated as the adhesive-receiving surface (examples from ExxonMobil Chemical Co.: Label-Lyte™ 50LL539, Label-Lyte™ 50LL534 II; Rayoface™ CPA). Occasionally, roll stock laminators will apply the pressure-sensitive adhesive to the wrong side of the film due to improper labeling of the input film or improperly mounting the roll on the line. The result is wasted material that is unsuitable for printing.

It would be desirable to have a label facestock that is capable of receiving adhesive or ink (especially radiation-cured inks) to either side of the label stock. This is technically challenging, for each surface must be capable of adhering a broad range of adhesives and printing inks while maintaining a low affinity between the opposing sides of a two-side coated label facestock. This is very challenging even if different coatings are used on opposing sides. The examples will show that coating composition technology can create such structures with symmetrically coated films.

This example demonstrates a print face coating similar to that taught in U.S. Pat. No. 6,893,722; and having an adhesive-receiving side according to US 2007/0248810 A1, the adhesive coating called, for short, an "acrylic-ionomer was immersed for 30 seconds in a 0.83 g/L methanolic solution of the potassium salt of ethyl eosin (Sigma-Aldrich) that was rinsed with water and patted dry with a tissue. The eosin dye binds to amines and the water rinse removes unbound dye. Optical density can be correlated with coating weight: thicker coatings yield a darker pink color after staining than thinner coatings. The primer was dried at 175° F. (about 80° C.). Line speed was set at 175 fpm and the film was treated with a bare-roll treater (from Pillar) with a power setting of 1.0 kW.

After preparing a one-side coated roll that was about 2000 feet long and 26 inches wide, the film was sent through the coater again with the same line conditions and primer so that the printable coating could be applied to the other side of the film.

The primer station contained a 200-Quad gravure cylinder that transferred the acrylic-based coating to an offset roll, which applied the coating to the film. The topcoat station was equipped with a 330-lpi ceramic gravure cylinder used as a kiss coater to apply the acrylic-based coating to the film while rotating at the same speed but in the direction opposite to that of the moving web.

The printable coating comprised 100 parts R1117 XL (an amine functional styrenated polyacrylate from Owensboro Specialty Polymers, LLC), 30 parts Ludox CLP, 5 parts acetoacetoxyethyl methacrylate (Sigma-Aldrich), 1 part MichemEmulsion™ 09730 (Michelman, Inc.), and 0.5 parts Tospearl™ 120 (Momentive Performance Materials Japan LLC). The coating weight for the printable surface was about 0.13 g/m² and was applied at 12% solids. The coating weights for this example were determined by weighing about 0.023 m² of coated film before and after the coatings were removed by hand extraction with methyl ethyl ketone.

Four days after the two-side coated structure was prepared, the 26-wide roll was slit into smaller rolls on a Dusenbery ribbon slitter. To look for blocking problems that might occur during shipment to tropical locations, a slit roll that was 4¾ inches wide and 1500 to 1700 feet long on a 3½-inch outside diameter ("OD") cardboard core was placed into a conditioning cabinet (Model 518 from Electro-tech System, Inc.) set at 50° C./50% RH for one week. After removing the roll from the conditioning cabinet, a small slab of film was taken from the outer portion of the roll for printing tests (see table), and the remainder of the roll was moved to ambient storage conditions. Six days later, an attempt was made to unwind the roll at about 550 feet/min on the Dusenbery ribbon slitter.

After conditioning, this roll had very little color. When the roll was unwound, continuous hissing was heard, then near the core the web broke. It was observed that if the printable surface of this example were applied to both sides of the structure, it would not be possible to unwind the film at all after a week of conditioning in a tropical environment.

Comparative Example 9

This Example demonstrates the coating disclosed in WO 2012-134695 on a clear film substrate. A two-sided coated roll was prepared, slit, and conditioned as described in Example 8 with the following differences. Mica H760A was applied in the pre-coat station such that the optical density at 510 nm after staining the dried primer (without a topcoat) with eosin dye was between 0.103 and 0.111 OD.

Unlike Example 8, the same topcoat (applied over the top of the dried primer) was used on both sides of the film, which comprised 100 parts of the Mica/AAEM coating composition [prepared at 10% theoretical solids containing 100 phr Mica H760A and 200 phr AAEM, as described in Example 2 of WO 2012-134695 (Blend 19)] and 100 parts Ludox CLP. The calculated average coating weight (based on the total amount of topcoat used after coating both sides) was applied at 3% solids to achieve a calculated coating weight of 0.0459 g/m².

After conditioning, this roll was noticeably more yellow than the roll in Example 8; however, the difference was not discernible to the eye when looking at only a few sheets. This roll unwound with less noise than Example 8. Initially this sample showed no hissing when it was unwound after conditioning for a week at 50° C./50% RH. Toward the middle of the roll and down to the core, very light hissing was heard periodically (perhaps due to slight variations in the coating weight). This conditioned roll was unwound to the core without tearing.

Example 10

This Example demonstrates the inventive coatings on a clear substrate. A two-side coated film roll was prepared, slit, and conditioned as described in Examples 8 and 9 with the following differences. No coatings were used in the pre-coat station on either pass. The topcoat station was equipped with a 120-lpi ceramic gravure cylinder, which was used to apply a coating composition comprising 100 phr Epomin P1050, 600 phr Denacol EX171, and 10 phr Imicure EMI-24, which, after initial mixing, was allowed to react for 22 hours at 53° C. before being diluted to 0.6% solids prior to coating. The coating weight on each side was about 0.030 g/m². The oven temperature for the topcoat oven was about 100° C. After conditioning for a week at 50° C./50% RH, the slit roll unwound to the core with no hissing or other signs of blocking. The conditioned roll had much less color than Example 9.

The values in Table 7 show RID values for samples printed as described in Example 1 with the 0-Ink-2 printing protocol. Ink adhesion (initially and after immersion in water) was essentially perfect for all three samples. Only samples prepared according to this invention were tested for RID after being conditioned for a week at 50° C./50% RH. This Example 10 had both sides of the slit film tested (identified as outside and inside).

TABLE 7

| Sample | RID for Ambient Samples % RID | RID for Samples Conditioned at 50° C./50% RH for One Week % RID |
|---|---|---|
| #-1 | 76.0 | Not Tested |
| #-2 | 66.9 | Not Tested |
| #-3 (out) | 97.8 | 100.8 |
| #-3 (in) | 100.7 | 96.4 |

This example shows that the inventive coatings are block resistant and they yield excellent ink density and adhesion, even after exposure to harsh conditions that might be experienced during shipping to a tropical climate. Moreover, results for the ambient-aged and conditioned samples yield superior RID values when compared with art taught in U.S. Pat. No. 6,893,722 and WO 2012-134695. Furthermore, excellent printability was available on both sides of the structure, and reduces the risk of a roll-stock laminator having to dispose of film in which the pressure-sensitive adhesive was applied to the wrong side of the film.

Ink applied to the adhesive-receiving side of Example 8 would yield essentially 0% adhesion. Example 9 prints equally well on both sides, but the relative ink density (RID) after being in contact with silicone was unacceptably low (less than 80%, similar to the lower portion of the sample in FIG. 3 that was not cleaned with tape prior to corona treatment in the RID test).

Now, having described the invention(s) and the various elements associated with them, set forth here in numbered paragraphs are:

1. A coated thermoplastic film, wherein at least one side of the film is coated with a coating composition, the coating composition comprising the reaction product of a PAI having at least primary amine, and an epoxide compound having at least one epoxide moiety, preferably one epoxide moiety, and a weight average molecular weight ($M_w$) of at least 200 or 300 or 400 or 500 or 800 or 1000 g/mole; or within a range of from 200 or 300 g/mole to 600 or 800 or 1000 g/mole.

2. A coated thermoplastic film having a coating composition on at least one side of the film, the coating composition comprising a substituted PAI having at least primary amines:

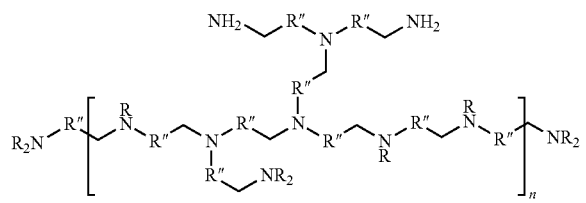

3. wherein each R is independently a hydrogen or an epoxide-derived group having at least one epoxide moiety, preferably one, and a weight average molecular weight ($M_w$) of at least 200 or 300 or 400 or 500 or 800 or 1000 g/mole; each R″ is selected from divalent $C_1$ to $C_4$ or $C_6$ or $C_{10}$ alkylene groups; and wherein n is a value within the range of from 50 to 100 or 400 or 600 or 800 or 1000 or 2000 or 3000 or 4000, or 8,000 or 10,000 or 15,000 or 20,000 wherein the degree and type of branching along the polymer backbone is variable, this formula representative of only several types of branching that can occur.

4. The coated thermoplastic film of numbered paragraphs 1 and 2, wherein the PAI also comprises secondary amines.

5. The coated thermoplastic film of any one of the previous numbered paragraphs, wherein the PAI also comprises tertiary amines.

6. The coated thermoplastic film of any one of the previous numbered paragraphs, wherein the thermoplastic film comprises at least one layer of a polymer selected from the group consisting of polypropylenes, polyethylenes, polyesters, nylons, and mixtures thereof 7. The coated thermoplastic film of any one of the previous numbered paragraphs, wherein the thermoplastic film comprises oriented polypropylene as its primary film layer.

8. The coated thermoplastic film of any one of the previous numbered paragraphs, where the coating composition is the reaction product with the additional component of an acetoacetoxy compound; wherein the coating weight of the coating on the film is within the range from 0.05 or 0.10 or 0.15 g/m² to 0.35 or 0.40 or 0.50 or 0.75 or 1.00 g/m².

9. The coated thermoplastic film of any one of the previous numbered paragraphs, where the coating composition is the reaction product with the additional component of ethylene oxide, propylene oxide, butylene oxide, or mixtures thereof; preferably ethylene oxide.

10. The coated thermoplastic film of any one of the previous numbered paragraphs, wherein the PAI has a weight average molecular weight ($M_w$) of from 10,000 or 20,000 g/mole to 80,000 or 100,000 or 200,000 or 500,000 or 800,000 or 1,000,000 g/mole.

11. The coated thermoplastic film of any one of the previous numbered paragraphs, wherein the PAI has a level of secondary amines within the range of from 20 or 30 or 40% to 60 or 70 or 80% relative to all the nitrogens on the PAI.

12. The coated thermoplastic film of any one of the previous numbered paragraphs, wherein the PAI has a level of primary and tertiary amines within the range of from 5 or 10 or 15% to 30 or 35 or 40 or 50% relative to all the nitrogens on the PAI.

13. The coated thermoplastic film of any one of the previous numbered paragraphs, wherein the epoxide compound (or epoxide-derived group) is selected (derived) from:

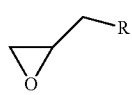

wherein R is hydrogen or another epoxide compound (the same or different), a fatty acid, a $C_{10}$ to $C_{50}$ alkyl; a $C_6$ or $C_8$ to $C_{22}$ or $C_{50}$ alkoxy, alcohol or ethoxylated alcohols; $C_6$ to $C_{40}$ phenyls or aryls and alkyl-substituted versions thereof, and combinations of any two or more of these groups, wherein "derivation" assumes a substitution reaction with either the alpha or beta carbon of the ethoxide group.

14. The coated thermoplastic film of any one of the previous numbered paragraphs, wherein the epoxide compound (or epoxide-derived group) is a glycidyl compound selected (derived) from:

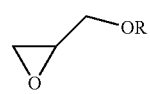

15. wherein R is hydrogen or another glycidyl compound (the same or different), a fatty acid, a $C_{10}$ to $C_{50}$ alkyl; a $C_6$ or $C_8$ to $C_{22}$ or $C_{50}$ alkoxy, alcohol or ethoxylated alcohols; $C_6$ to $C_{40}$ phenyls or aryls and alkyl-substituted versions thereof, and combinations of any two or more of these groups, wherein "derivation" assumes a substitution reaction with either the alpha or beta carbon of the ethoxide group.

16. The coated thermoplastic film of numbered paragraphs 12 or 13, wherein the glycidyl compound is selected from mono-functional glycidyl ethers of ethoxylated primary, secondary, and tertiary alcohols having a weight average molecular weight ($M_w$) of at least 200 or 300 or 400 or 500 or 600 g/mole.

17. The coated thermoplastic film of any one of the previous numbered paragraphs, wherein the epoxide compound (or epoxide-derived group) is a mono-functional, water-soluble glycidyl ether having greater than or equal to 12 or 14 or 16 or 18 or 20 moles of ethoxylation; or within a range from 10 or 12 or 14 moles to 18 or 20 or 24 moles of ethoxylation.

18. The coated thermoplastic film of numbered paragraph 7, wherein the acetoacetoxy compound is selected from:

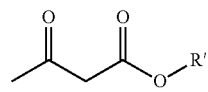

wherein R' is an acrylate or methacrylate moiety, a $C_1$ to $C_{20}$ alkyl or alkylene, a $C_1$ to $C_{20}$ alkoxy or hydroxide or alkyl-substituted versions thereof 19. The coated thermoplastic film of any one of the previous numbered paragraphs, wherein the weight of the dried coating compound on each side of the film is within the range from 0.005 or 0.010 or 0.015 g/m² to 0.035 or 0.040 or 0.050 or 0.075 or 0.100 g/m².

20. The coated thermoplastic film of any one of the previous numbered paragraphs, wherein the coated film is not energy-treated (e.g., heat, corona, plasma, e-beam) prior to rolling and storage.

21. The coated thermoplastic film of any one of the previous numbered paragraphs, further comprising printing upon the coated side of the film.
22. The coated thermoplastic film of numbered paragraph 19, wherein the coated side of the film has within the range from 2 or 3 or 5 mol % to 10 or 15 mol % silicon on its surface, based on the relative elemental abundance of all silicon-containing species detected by ESCA.
23. The coated thermoplastic film of any one of the previous numbered paragraphs, wherein ethenic unsaturation is substantially absent from the coating composition.
24. The coated thermoplastic film of any one of the previous numbered paragraphs, wherein the epoxide compound is reacted with the PAI in an amount to bind to between 10 or 20 or 30 or 40 or 50% to 60 or 70 or 80 or 90 or 95 or 100% of the primary amines of the polymer.
25. A method for making the coated film of any of the previous numbered paragraphs comprising:
    combining in water a PAI having at least primary amines, the epoxide compound having at least one epoxide moiety, preferably one, and a weight average molecular weight ($M_w$) of at least 200 or 400 or 500 or 800 or 1000 g/mole, forming a reaction product;
    diluting or otherwise adjusting the aqueous reaction product to a solids level within the range of from 0.1 or 0.25 or 0.5 or 1 or 2 or 4% to 5 or 10 or 15 or 20%; in the alternative, adjusting the reaction product viscosity (25° C.) to a level of less than 1000 or 800 or 500 or 400 cP, or within a range of from 10 or 20 or 50 cP to 500 or 800 or 1000 cP by the addition of water or an alcohol and/or the addition of some processing agent;
    applying the diluted/adjusted reaction product evenly to at least one surface of a thermoplastic film;
    drying the reaction product on the at least one film surface to form a dried coating composition at a temperature within the range of from 70 or 80° C. to 120 or 130 or 140° C.;
    wherein the weight of the dried coating compound on each side of the film is within the range from 0.005 or 0.010 or 0.015 g/m² to 0.035 or 0.040 or 0.050 or 0.075 or 0.100 g/m².
26. The use of the coated thermoplastic film of any one of the previous numbered paragraphs.
27. The use of a coated thermoplastic film as a label, the coated thermoplastic film formed from the coated film of any one of the previous numbered paragraphs.

The invention claimed is:
1. A coated thermoplastic film, wherein at least one side of the coated thermoplastic film is coated with a coating composition, the coating composition comprising a reaction product of a polyalkyleneimine having one or more primary amines, an epoxide compound having at least one epoxide moiety and a weight average molecular weight ($M_w$) of at least 200 g/mole, and an additional component of an acetoacetoxy compound, propylene oxide, butylene oxide, or mixtures of at least two compounds selected form a group consisting of ethylene oxide, propylene oxide, or butylene oxide.
2. The coated thermoplastic film of claim 1, wherein the polyalkyleneimine also comprises at least one amine selected from a group consisting of secondary amines, tertiary amines, and combinations thereof.
3. The coated thermoplastic film of claim 1, wherein the coated thermoplastic film comprises at least one layer of a polymer selected from a group consisting of polypropylenes, polyethylenes, polyesters, nylons, and mixtures thereof.
4. The coated thermoplastic film of claim 1, wherein the coated thermoplastic film comprises oriented polypropylene as its primary film layer.
5. The coated thermoplastic film of claim 1, wherein a coating weight of the coating composition comprising the acetoacetoxy compound on the coated thermoplastic film is within a range from 0.05 g/m² to 1.00 g/m².
6. The coated thermoplastic film of claim 1, wherein the polyalkyleneimine has a weight average molecular weight ($M_w$) of from 10,000 g/mole to 1,000,000 g/mole.
7. The coated thermoplastic film of claim 1, wherein the epoxide compound is selected from:

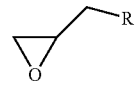

wherein R is hydrogen or another epoxide compound that is the same or different, a fatty acid, a $C_{10}$ to $C_{50}$ alkyl; a $C_6$ or $C_8$ to $C_{22}$ or $C_{50}$ alkoxy, alcohol or ethoxylated alcohols; $C_6$ to $C_{40}$ phenyls or aryls and alkyl-substituted versions thereof, and combinations thereof.

8. The coated thermoplastic film of claim 1, wherein the epoxide compound is a glycidyl compound selected from:

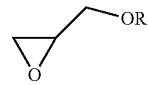

wherein R is hydrogen or another glycidyl compound that is the same or different, a fatty acid, a $C_{10}$ to $C_{50}$ alkyl; a $C_6$ or $C_8$ to $C_{22}$ or $C_{50}$ alkoxy, alcohol or ethoxylated alcohols; $C_6$ to $C_{40}$ phenyls or aryls and alkyl-substituted versions thereof, and combinations thereof.

9. The coated thermoplastic film of claim 1, wherein the epoxide compound is a mono-functional, water-soluble glycidyl ether having greater than or equal to 12 moles of ethoxylation.
10. The coated thermoplastic film of claim 1, wherein the coated thermoplastic film is not energy-treated by means of heat, corona, plasma, e-beam, or otherwise prior to rolling, storing, or combinations thereof.
11. The coated thermoplastic film of claim 1, wherein ethenic unsaturation is substantially absent from the coating composition.
12. The coated thermoplastic film of claim 1, wherein the epoxide compound is reacted with the polyalkyleneimine in an amount to bind to between 10% to 100% of the one or more primary amines of the polyalkyleneimine.
13. A coated thermoplastic film having a coating composition on at least one side of the coated thermoplastic film, the coating composition comprising a substituted polyalkyleneimine having one or more primary amines:

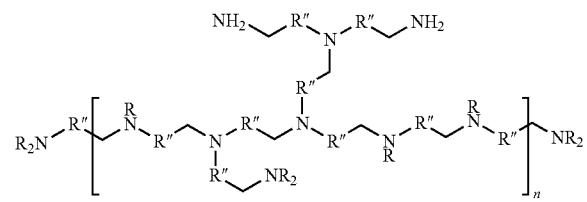

wherein each R is independently a hydrogen or an epoxide-derived group having at least one epoxide moiety and a weight average molecular weight ($M_w$) of at least 200 g/mole; each R" is selected from divalent $C_1$ to $C_4$ or $C_6$ or $C_{10}$ alkylene groups; and wherein n is a value within a range of from 50 to 20,000, and a reaction product with an additional component of an acetoacetoxy compound, propylene oxide, butylene oxide, or mixtures of at least two compounds selected form a group consisting of ethylene oxide, propylene oxide, or butylene oxide.

14. The coated thermoplastic film of claim 13, wherein the polyalkyleneimine also comprises at least one amine selected from a group consisting of secondary amines, tertiary amines, and combinations thereof.

15. The coated thermoplastic film of claim 13, wherein the coated thermoplastic film comprises at least one layer of a polymer selected from a group consisting of polypropylenes, polyethylenes, polyesters, nylons, and mixtures thereof.

16. The coated thermoplastic film of claim 13, wherein the coated thermoplastic film comprises oriented polypropylene as its primary film layer.

17. The coated thermoplastic film of claim 13, wherein a coating weight of the coating composition comprising the acetoacetoxy compound on the coated thermoplastic film is within a range from 0.05 g/m² to 1.00 g/m².

18. The coated thermoplastic film of claim 13, wherein the epoxide-derived group is selected from an epoxide:

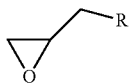

wherein R is hydrogen or another epoxide compound that is the same or different, a fatty acid, a $C_{10}$ to $C_{50}$ alkyl; a $C_6$ or $C_8$ to $C_{22}$ or $C_{50}$ alkoxy, alcohol or ethoxylated alcohols; $C_6$ to $C_{40}$ phenyls or aryls and alkyl-substituted versions thereof, and combinations thereof.

19. The coated thermoplastic film of claim 13, wherein the epoxide-derived group is a glycidyl compound selected from:

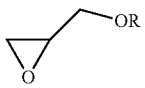

wherein R is hydrogen or another glycidyl compound that is the same or different, a fatty acid, a $C_{10}$ to $C_{50}$ alkyl; a $C_6$ or $C_8$ to $C_{22}$ or $C_{50}$ alkoxy, alcohol or ethoxylated alcohols; $C_6$ to $C_{40}$ phenyls or aryls and alkyl-substituted versions thereof, and combinations thereof.

20. The coated thermoplastic film of claim 1, wherein the epoxide-derived group is a mono-functional, water-soluble glycidyl ether having greater than or equal to 12 moles of ethoxylation.

21. The coated thermoplastic film of claim 13, wherein the coated thermoplastic film is not energy-treated by means of heat, corona, plasma, e-beam, or otherwise prior to rolling, storing, or combinations thereof.

22. The coated thermoplastic film of claim 13, wherein ethenic unsaturation is substantially absent from the coating composition.

23. The coated thermoplastic film of claim 13, wherein the epoxide compound is reacted with the polyalkyleneimine in an amount to bind to between 10% to 100% of the one or more primary amines of the polyalkyleneimine.

24. A method for making a coated film comprising:
combining in water a polyalkyleneimine having one or more primary amines, an epoxide compound having at least one epoxide moiety and a weight average molecular weight ($M_w$) of at least 200 g/mole, and an additional component of an acetoacetoxy compound, propylene oxide, butylene oxide, or mixtures of at least two compounds selected form a group consisting of ethylene oxide, propylene oxide, or butylene oxide, forming a reaction product;
diluting the reaction product in the water to a solids level within a range of from 0.1% or 20% solids;
applying, subsequent to the diluting, the reaction product evenly to at least one surface of a thermoplastic film; and
drying, subsequent to the applying, the reaction product on the at least one surface of the thermoplastic film to form a dried coating composition at a temperature within a range of from 70° C. to 140° C.

25. The coated thermoplastic film of claim 1, further comprising printing upon a coated side of the at least one side of the coated thermoplastic film.

26. The coated thermoplastic film of claim 1, further comprising incidental silicon in a range from 2 mol % to 15 mol % as a result of being in contact with adjacent film layers in a roll or through other incidental contact or removable layer.

* * * * *